US008209183B1

(12) United States Patent
Patel et al.

(10) Patent No.: US 8,209,183 B1
(45) Date of Patent: Jun. 26, 2012

(54) SYSTEMS AND METHODS FOR CORRECTION OF TEXT FROM DIFFERENT INPUT TYPES, SOURCES, AND CONTEXTS

(75) Inventors: Nirmal Patel, Mountain View, CA (US); Thad Starner, Mountain View, CA (US); Josh Weaver, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/177,821

(22) Filed: Jul. 7, 2011

(51) Int. Cl.
G10L 11/00 (2006.01)
G10L 15/26 (2006.01)
G06K 9/34 (2006.01)
G06F 17/00 (2006.01)

(52) U.S. Cl. ........ 704/270; 704/235; 382/181; 715/275; 715/727

(58) Field of Classification Search .................. None
See application file for complete search history.

(56) References Cited

U.S. PATENT DOCUMENTS

| | | | |
|---|---|---|---|
| 6,236,768 B1 | 5/2001 | Rhodes et al. |
| 6,731,253 B1 | 5/2004 | Arnold |
| 7,058,888 B1 | 6/2006 | Gjerstad et al. |
| 7,149,970 B1 | 12/2006 | Pratley et al. |
| 7,164,753 B2 | 1/2007 | Engelke et al. |
| 7,200,555 B1 | 4/2007 | Ballard et al. |
| 7,319,957 B2 | 1/2008 | Robinson et al. |
| 7,372,429 B1 | 5/2008 | Benson |
| 7,380,203 B2 | 5/2008 | Keely et al. |
| 7,587,308 B2 | 9/2009 | Kasravi et al. |
| 7,668,718 B2 | 2/2010 | Kahn et al. |
| 7,881,936 B2 | 2/2011 | Longe et al. |
| 7,899,674 B1* | 3/2011 | Rubin .................. 704/270.1 |
| 7,928,926 B2 | 4/2011 | Yamamoto et al. |

(Continued)

FOREIGN PATENT DOCUMENTS

EP    1635328    3/2006

(Continued)

OTHER PUBLICATIONS

Hollerer, "User Interfaces for Mobile Augmented Reality Systems," PhD Thesis, Columbia University, Dept. of Computer Science, New York, NY, 2004, available at http://www.cs.ucsb.edu/~holl/pubs/hollerer-2004-diss.pdf (last visited Jul. 7, 2011).

(Continued)

*Primary Examiner* — Brian Albertalli
(74) *Attorney, Agent, or Firm* — McDonnell Boehnen Hulbert & Berghoff LLP

(57) ABSTRACT

Methods and apparatus related to correcting errors are disclosed. Inputs having a plurality of input types can be received at a wearable computing device. A text string corresponding to the inputs can be generated using the wearable computing device. The text string can include a plurality of segments, where each segment can be associated with an input type. For a given segment of the text string, one or more corrected segments can be generated by applying an error-correction filter configured to correct errors based on an input type associated with the given segment and a location-sensitive context. At least one of the corrected segments can be displayed using the wearable computing device. A corrected segment can be selected using the wearable computing device. A corrected text string including the selected corrected segment can be displayed using the wearable computing device.

19 Claims, 13 Drawing Sheets

U.S. PATENT DOCUMENTS

| | | |
|---|---|---|
| 2002/0044104 A1 | 4/2002 | Friedrich et al. |
| 2002/0167463 A1 | 11/2002 | Inoguchi |
| 2003/0046401 A1 | 3/2003 | Abbott et al. |
| 2005/0195129 A1 | 9/2005 | Yamazaki et al. |
| 2006/0017657 A1 | 1/2006 | Yamasaki |
| 2006/0028400 A1 | 2/2006 | Lapstun et al. |
| 2006/0282575 A1 | 12/2006 | Schultz et al. |
| 2007/0277103 A1 | 11/2007 | Theimer et al. |
| 2007/0296646 A1 | 12/2007 | Yamamoto et al. |
| 2008/0024391 A1 | 1/2008 | Oliver et al. |
| 2008/0030429 A1 | 2/2008 | Hailpern |
| 2008/0084362 A1 | 4/2008 | Yamamoto |
| 2008/0122736 A1 | 5/2008 | Ronzani et al. |
| 2008/0198097 A1 | 8/2008 | Ishino et al. |
| 2008/0270128 A1 | 10/2008 | Lee et al. |
| 2009/0018830 A1 | 1/2009 | Emmanuel |
| 2009/0144056 A1* | 6/2009 | Aizenbud-Reshef et al. 704/228 |
| 2010/0023320 A1 | 1/2010 | Di Cristo et al. |
| 2010/0041000 A1 | 2/2010 | Glass et al. |
| 2010/0309097 A1 | 12/2010 | Raviv et al. |
| 2011/0034176 A1 | 2/2011 | Lord et al. |
| 2011/0098029 A1 | 4/2011 | Rhoads et al. |
| 2011/0143811 A1 | 6/2011 | Rodriguez |
| 2012/0050144 A1 | 3/2012 | Morlock |

FOREIGN PATENT DOCUMENTS

| | | |
|---|---|---|
| EP | 1705554 | 9/2006 |
| EP | 2264563 | 12/2010 |

OTHER PUBLICATIONS

Suhm, "Empirical Evaluation of Interactive Multimodal Error Correction," Proceedings of 1997 IEEE Workshop on Automatic Speech Recognition and Understanding, Santa Barbara, CA, Dec. 14-17, 1997, available at http://citeseerx.ist.psu.edu/viewdoc/download?doi=10.1.1.30.4188&rep=rep1&type=pdf (last visited Jul. 7, 2011).

Taghva et al. "OCRSpell: an interactive spelling correction system for OCR errors in text," International Journal on Document Analysis and Recognition, 2001, vol. 3, pp. 125-137, available at http://citeseerx.ist.psu.edu/viewdoc/download?doi=10.1.1.63.2509&rep=rep1&type=pdf (last visited Jul. 7, 2011).

* cited by examiner

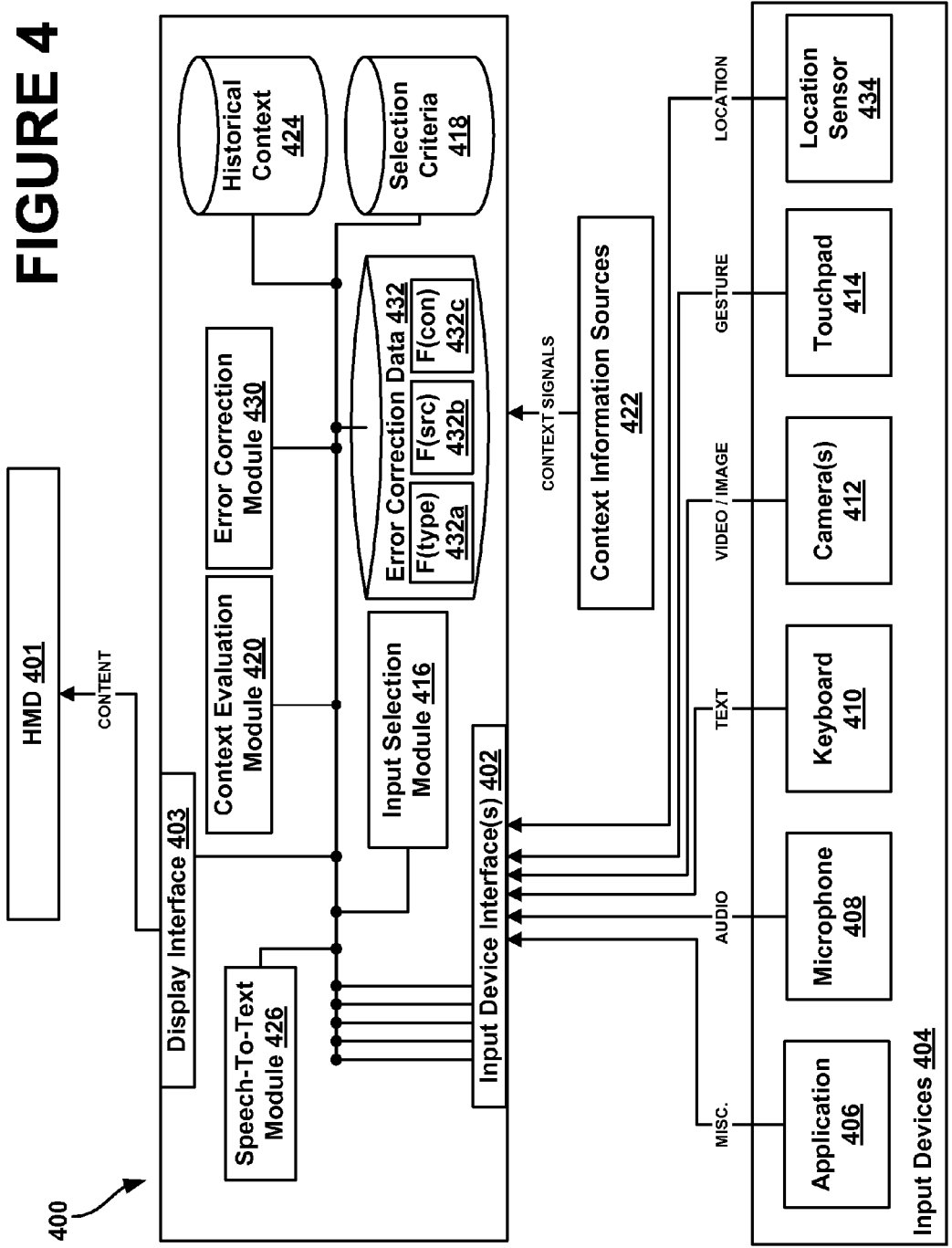

SYSTEMS AND METHODS FOR CORRECTION OF TEXT FROM DIFFERENT INPUT TYPES, SOURCES, AND CONTEXTS

BACKGROUND

Unless otherwise indicated herein, the materials described in this section are not prior art to the claims in this application and are not admitted to be prior art by inclusion in this section.

Software applications such as word processing applications can be used to create, edit, and/or view information containing text. For example, word processing software, such as Microsoft Word, can be used to create, edit, and/or view documents that include text. Text can be used in other applications as well, such as web pages and messaging services.

Additional software and/or hardware applications can be used to convert various inputs, such as speech, video, and paper documents, to computer-usable text. These applications can recognize words in input and generate corresponding text as output. In some cases, the output text includes errors.

SUMMARY

In a first aspect of the disclosure of the application, a method is provided. Inputs having a plurality of input types are received at a wearable computing device. A text string corresponding to the inputs is generated using the wearable computing device. The text string includes a plurality of segments. Each segment is associated with an input type of the plurality of input types. The text string is displayed using the wearable computing device. For a given segment of the text string, one or more corrected segments are generated by applying an error-correction filter to the given segment using the wearable computing device, wherein the error-correction filter is configured to correct errors based on an input type associated with the given segment and on a location-sensitive context. At least one of the one or more corrected segments is displayed using the wearable computing device. A selected corrected segment of the one or more corrected segments is selected using the wearable computing device. A corrected text string including the selected corrected segment is displayed using the wearable computing device.

In a second aspect of the disclosure of the application, a wearable computing device is provided. The wearable computing device includes a display; a plurality of input devices, wherein each input device is associated with an input type; a processor; and memory. The memory has one or more instructions that, in response to execution by the processor, causes the wearable computing device to perform functions. The functions include: (i) receiving inputs from at least some of the plurality of input devices, (ii) generating a text string corresponding to the inputs, wherein the text string includes a plurality of segments and each segment is associated with an input type of the plurality of input types, (iii) displaying the text string using the display, (iv) for a given segment of the text string, generating one or more corrected segments by applying an error-correction filter to the given segment using the wearable computing device, where the error-correction filter is configured to correct errors based on an input type associated with the given segment and on a location-sensitive context, (v) displaying at least the one or more corrected segments using the display, (vi) selecting a selected corrected segment of the one or more corrected segments; and (vii) displaying a corrected text string comprising the selected corrected segment using the display.

In a third aspect of the disclosure of the application, an article of manufacture is provided. The article of manufacture includes a computer-readable storage medium having instructions stored thereon that, in response to execution by a processor, cause the processor to perform operations. The instructions include: (i) instructions for receiving inputs having a plurality of input types, (ii) instructions for generating a text string corresponding to the inputs, wherein the text string includes a plurality of segments and each segment is associated with an input type of the plurality of input types, (iii) instructions for displaying the text string, (iv) instructions for generating, for a given segment of the text string, one or more corrected segments by applying an error-correction filter to the given segment, wherein the error-correction filter is configured to correct errors based on an input type associated with the given segment and on a location-sensitive context, (v) instructions for displaying at least the one or more corrected segments, (vi) instructions for selecting a selected corrected segment of the one or more corrected segments, and (vii) instructions for displaying a corrected text string comprising the selected corrected segment.

BRIEF DESCRIPTION OF THE FIGURES

FIG. 4 is a functional block diagram for a wearable computing system, in accordance with an example embodiment.

DETAILED DESCRIPTION

Overview

Figure 1:
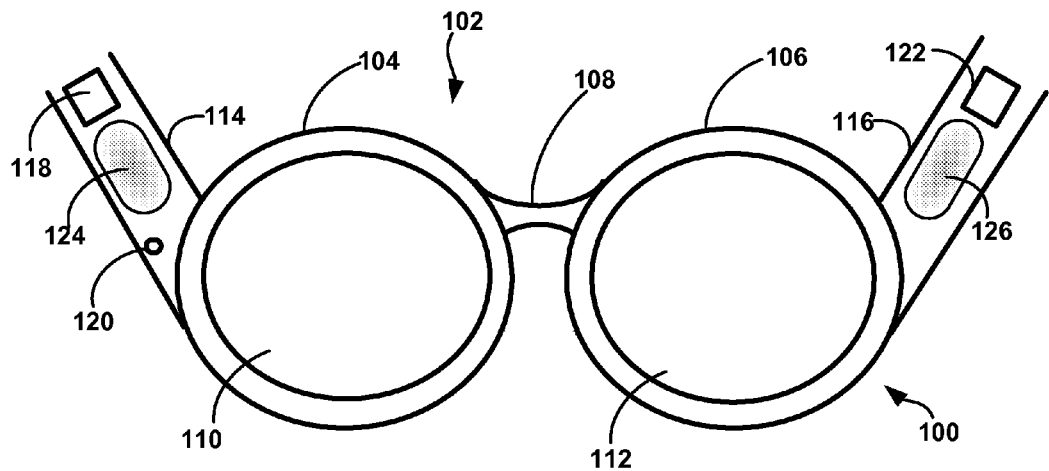
FIG. 1 is a first view of an example system for receiving, transmitting and displaying data, in accordance with example embodiments.

Techniques are described herein for correcting errors in text using a computing device, such as a wearable computing device. Such computing devices, including wearable computing devices, commonly receive inputs from a number of sources, such as, but not limited to, keyboards, touch screens, paper documents, writing surfaces for hand-written input, microphones, and network interfaces. Computer-readable text, or "text" for short, can be generated from these input sources, and it is not unusual that this text includes errors. To correct these errors, it is well known to perform text correction; for example, an e-mail interface receiving text input can provide suggestions for completing and/or correcting text as entered.

Text received by a computing device can include errors of at least three different types: input type errors, input source errors, and input context errors. Input type errors are errors that can be associated with an input source for the text. For example, text from a keyboard often has the word "the" misspelled as "teh". As another example, a speech-to-text converter could convert the spoken word "virus" erroneously into the text "wire us." Similar examples for errors in text conversion can be found for text based on optical character recognition (OCR), handwritten input, and other input sources.

Additionally, some errors in text can be linked to specific input sources. For example, suppose two users, User A and User B, are providing spoken input via a microphone to a speech-to-text program. When both users speak the word "virus", the speech-to-text program may erroneously generate the text "wire us" for User A, while correctly generating the text "virus" for User B. However, when both users speak the words "you all", the speech-to-text program may erroneously generate the text "yawl" for User B, while correctly generating the text "you all" for User A.

Further, some errors can be more readily corrected by knowing the input context. When correcting errors in the text of a book on zoology, the input of "Mon Key" should more likely be corrected to "monkey" than "Monday key." Additional context information, such as other documents, location, contact information, etc. can be part of the input context as well.

The context can be "location sensitive" or depend on location. For example, a context can include associations to people, buildings, activities, speech, video, and/or other inputs that are proximate to the wearable computing device. In some scenarios, the context can be based on a time of the year; for example, the context can include information that phrases associated with Christmas such as "Santa Claus", "Yuletide", "Jingle Bells", etc. are more common in December than in July. Location-sensitive context can include documents, location, contact information, etc., just as with any other type of context.

To address at least these limitations, devices and methods can involve an auto-correction technique that corrects errors based on, e.g., the input type, input source or context. Upon receiving the text, the device can determine the input types(s), input source(s) and context(s) and scan for the text for errors using one or more different types of error-correction filters: input-type, input-device, and input-context.

These devices and methods can perform error correction using at least two different techniques: an automatic technique, where the text is corrected without external input, and a manual technique, where the text is corrected by providing a number of correction options, and then corrected based on a selection of one of the correction options.

System and Device Architecture

FIG. 1 illustrates an example system 100 for receiving, transmitting, and displaying data. The system 100 is shown in the form of a wearable computing device. While FIG. 1 illustrates eyeglasses 102 as an example of a wearable computing device, other types of wearable computing devices could additionally or alternatively be used.

As illustrated in FIG. 1, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed. Each of the lens elements 110 and 112 may also be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and can be positioned behind a user's ears to secure the eyeglasses 102 to the user. The extending side-arms 114 and 116 may further secure the eyeglasses 102 to the user by extending around a rear portion of the user's head. Additionally or alternatively, the system 100 may be connected to or be integral to a head-mounted helmet structure. Other possibilities exist as well.

The system 100 may also include an on-board computing system 118, a video camera 120, a sensor 122, and finger-operable touch pads 124, 126. The on-board computing system 118 is shown to be positioned on the extending side-arm 114 of the eyeglasses 102; however, the on-board computing system 118 may be provided on other parts of the eyeglasses 102. The on-board computing system 118 may include a processor and memory, for example. The on-board computing system 118 may be configured to receive and analyze data from sensor 118, video camera 120 and finger-operable touch pads 124, 126 (and possibly from other sensory devices, user interfaces, or both) and generate images for output to the lens elements 110 and 112. In some embodiments, touch pads 124 and/or 126 can be configured to process handwriting inputs.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown mounted on the extending side-arm 116 of the eyeglasses 102; however, the sensor 122 may be provided on other parts of the eyeglasses 102. The sensor 122 may include one or more motion sensors, such as a gyroscope and/or an accelerometer. Other sensing devices may be included within the sensor 122 and other sensing functions may be performed by the sensor 122.

The finger-operable touch pads 124, 126 are shown mounted on the extending side-arms 114, 116 of the eyeglasses 102. Each of finger-operable touch pads 124, 126 may be used by a user to input commands. The finger-operable touch pads 124, 126 may sense at least one of a position and a movement of a finger via capacitive sensing, resistance sensing, or a surface acoustic wave process, among other possibilities. The finger-operable touch pads 124, 126 may be capable of sensing finger movement in a direction parallel to the pad surface, in a direction normal to the pad surface, or both, and may also be capable of sensing a level of pressure applied. The finger-operable touch pads 124, 126 may be formed of one or more translucent or transparent insulating layers and one or more translucent or transparent conducting layers. Edges of the finger-operable touch pads 124, 126 may be formed to have a raised, indented, or roughened surface, so as to provide tactile feedback to a user when the user's finger reaches the edge of the finger-operable touch pads 124, 126. Each of the finger-operable touch pads 124, 126 may be operated independently, and may provide a different function.

Figure 2:
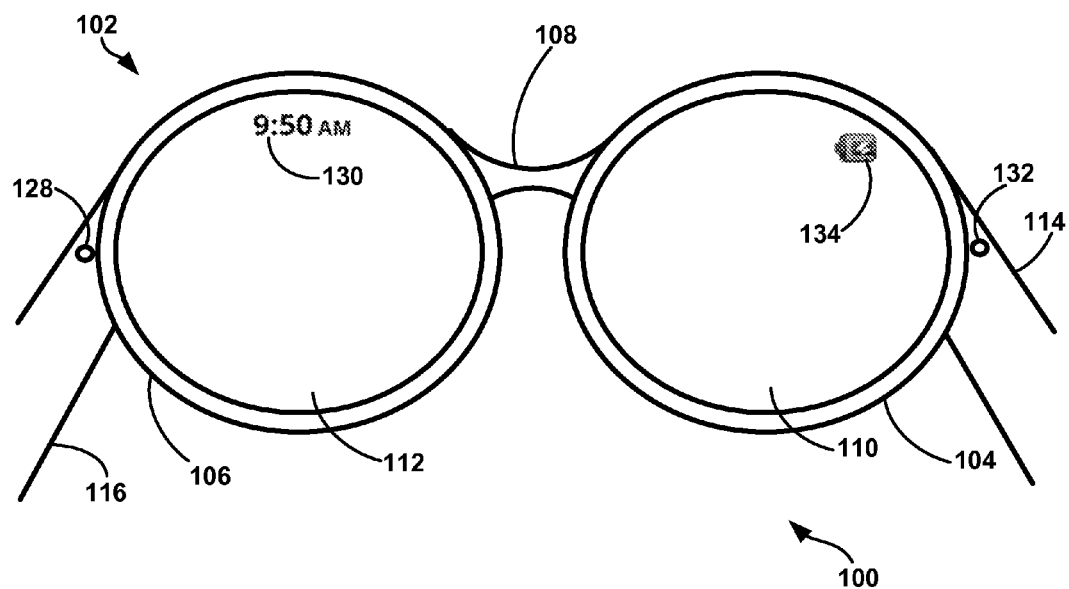
FIG. 2 is a second view of the example system of FIG. 1, in accordance with example embodiments.

FIG. 2 illustrates another view of the system 100 of FIG. 1. As shown in FIG. 2, the lens elements 110 and 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110 and 112 may act as a combiner in a light projection system and may include a coating that reflects the light projected onto them from the projectors 128 and 132. In some embodiments, a special coating may not be used (e.g., when the projectors 128 and 132 are scanning laser devices).

In alternative embodiments, other types of display elements may also be used. For example, the lens elements 110, 112 themselves may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

In other embodiments (not shown in FIGS. 1 and 2), system 100 can be configured for audio output. For example, system 100 can be equipped with speaker(s), earphone(s), and/or earphone jack(s). In these embodiments, audio output can be provided via the speaker(s), earphone(s), and/or earphone jack(s). Other possibilities exist as well.

Figure 3:
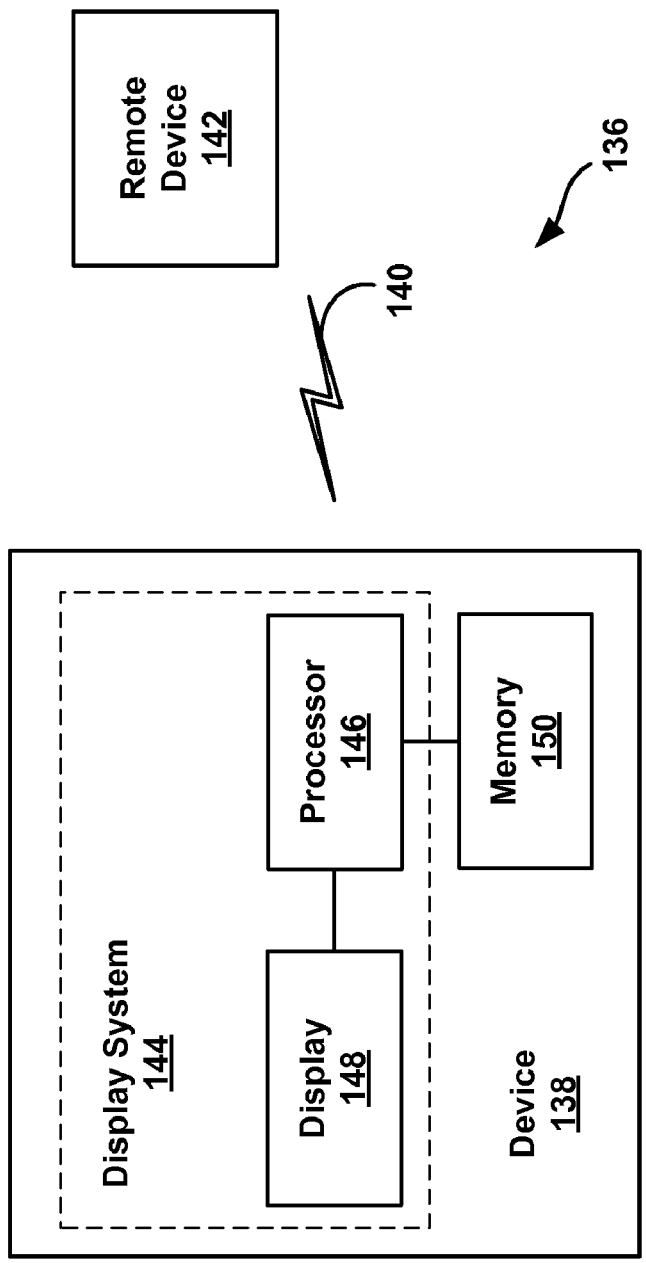
FIG. 3 is an example schematic drawing of computer network infrastructure, in accordance with an example embodiment.

FIG. 3 is a schematic drawing of a system 136 illustrating an example computer network infrastructure. In system 136, a device 138 communicates using a communication link 140 (e.g., a wired or wireless connection) to a remote device 142. The device 138 may be any type of device that can receive data and display information corresponding to or associated with the data. For example, the device 138 may be a heads-up display system, such as the eyeglasses 102 described with reference to FIGS. 1 and 2.

Thus, the device 138 may include a display system 144 comprising a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a microprocessor or a digital signal processor, for example.

The device 138 may further include on-board data storage, such as memory 150 shown coupled to the processor 146 in FIG. 3. The memory 150 may store software and/or data that can be accessed and executed by the processor 146, for example.

The remote device 142 may be any type of computing device or transmitter including a laptop computer, a mobile telephone, etc., that is configured to transmit data to the device 138. The remote device 142 and the device 138 may contain hardware to enable the communication link 140, such as processors, transmitters, receivers, antennas, etc.

In FIG. 3, the communication link 140 is illustrated as a wireless connection. The wireless connection could use, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Alternatively or additionally, wired connections may be used. For example, the communication link 140 may be a wired link via a serial bus such as a universal serial bus or a parallel bus. A wired connection may be a proprietary connection as well. The remote device 142 may be accessible via the Internet and may comprise a computing cluster associated with a particular web service (e.g., social-networking, photo sharing, address book, etc.).

Example Wearable Computing System

FIG. 4 is a functional block diagram for a wearable computing system 400 in accordance with an example embodiment. System 400 is configured to monitor incoming data from a number of input devices 404 and display information related to the incoming data on Head Mounted Display (HMD) 401. For example, system 400 can monitor speech received via microphone 408 and, may convert the speech to text using speech-to-text module 426. The input speech can include instructions that specify actions and objects for the actions. Accordingly, system 400 can be configured to detect instructions, and to responsively initiate the actions specified in the instructions.

Example Input Devices

As shown in FIG. 4, system 400 includes one or more input-device interfaces 402 for receiving data from input devices 404 and one or more output devices, such as HMD 401, for presenting information related to the data from input devices. In the illustrated embodiment, the input devices 404 include, for example, an application 406, a microphone 408, a keyboard 410, a camera 412, a touchpad 414, and a location sensor 434. A given input-device interface 402 may be configured to interface with and receive data from a single input device, such as microphone 408. Alternatively, a given input-device interface 402 may be configured to simultaneously interface with multiple input devices, such as some or all of input devices 406-414.

System 400 can receive a number of different types of input data from input devices 404. In the illustrated embodiment, system 400 may receive, for example, audio data from microphone 408, text data from keypad 410, video data and/or image data from camera(s) 412, and/or gesture data from touchpad 414. In some scenarios, multiple inputs can be received simultaneously. A system may be configured to receive other modalities of data, in addition or in the alternative to those described, without departing from the scope of the invention.

In some embodiments, some or all types of input data can be converted to text. For some types of input data, such as input data from keyboard 410 and touchpad 414, no conversion may be needed. For other types of input, conversion modules, such as speech-to-text module 426 and/or a video-to-text module (not shown in FIG. 4), can be used to convert input data to text. Applications, such as application 406, may generate text, audio input, video input, and/or other types of input (e.g., encrypted input, compressed input, other types of binary input, etc.). Thus, application-specific techniques can be used generate input text from inputs derived from application 406.

Location sensor 434 can utilize one or more technologies and sensors to determine and provide a location of system 400. Example technologies include, but are not limited to, Global Positioning System (GPS) technologies and sensors, other satellite-based technologies and sensors, inertial navigation technologies, timing circuitry, accelerometers, compasses, velocity sensors, and gyroscopes. In some embodiments, location sensor 434 can determine and provide related information to system 400, such as velocity including both speed and direction(s) of travel, acceleration, distance(s) traveled, and timing information. Many other types of related information are possible as well.

Other input devices not shown in FIG. 4 can be utilized as well. For example, sensors, scanners, pads configured for touch and/or handwriting input, optical character recognition (OCR) related devices such as scanners, and various other devices can be used as input sources to system 400. In some embodiments, system 400 can be configured with one or more input and/or output ports or jacks configured for communicating with input and/or output devices.

Selection Criteria for Input Content

In the illustrated embodiment, system 400 includes an input selection module 416, which generally functions to evaluate the input data from the various input devices 404. In particular, input selection module 416 may be configured to receive input data from the input devices 404 via input device interfaces 402 and detect one or more data patterns in the input data.

In some cases, input selection module 416 may detect multiple concurrent data patterns in the input data. For example, input selection module 416 may detect a first data pattern in data from a first source and, simultaneously, detect a second data pattern in data from a second source. As such, selection criteria 418 may provide input-selection rules that prioritize certain data patterns and/or certain input devices.

For instance, selection criteria 418 may prioritize detection of speech in audio data from microphone 408 over other data patterns detected in video data from camera 412. Accordingly, some embodiments may be configured to display a text conversion of speech whenever speech matching a data pattern is detected in incoming audio data, regardless of whether there is also a matching data pattern in incoming video data. Similarly, if input selection module 416 detects that a user is entering text via a keyboard 410, this text may be displayed, even when there is a matching data pattern in incoming audio data and/or in incoming video data; for example, where keyboard data is given priority over audio data and video data by selection criteria 418.

In a further aspect, selection criteria 418 may provide input-selection rules that prioritize certain data patterns when multiple matching data patterns are detected from a common input device. For instance, when explicit commands are received in audio data, the explicit commands may be given priority over implicit information in the audio data from input devices 404. As one specific example, input-selection criteria 418 may specify that when a user says "show video" (e.g., when "show video" is detected in audio data from microphone 408), then this should be interpreted as an explicit command to select camera 412 as the input device and display video from camera 412.

It should be understood selection criteria 418 may specify other hierarchies and/or other prioritizations of input devices and/or data patterns, without departing from the scope of the invention. Thus, selection criteria 418 may be based on one or more objectives in a specific implementation.

In a further aspect, there may be scenarios where the selection criteria 418 indicate that multiple input devices 404 should be selected. For example, a scenario may exist where text is detected in input data from keyboard 410 and speech is detected in audio data from microphone 408. In this scenario, speech-to-text module 426 may convert the speech from the audio data to text, and this text may be merged with the text from the keyboard for display. As another example, scenarios may exist where video or an image from camera 412 is displayed, and text is overlaid on top of the video or image. In such a scenario, the text may be obtained from the keyboard 410 and/or obtained via speech-to-text module 426 converting speech in audio data from microphone 408. In another example, a location input from location sensor 434 can be combined with text and/or video derived from one or more of input devices 406-414. Many other examples of combinations of multiple input devices, which combine a variable number of input devices, are also possible.

In another aspect, the selection criteria 418 can indicate that inputs are to be corrected by error correction module 430. Error correction module 430 can be configured to receive one or more segments of text related to any of the input devices 404, evaluate the segments of text, and responsively generate one or more corrected segments of text.

Error correction module 430 can utilize error correction data 432, historical context 424, and/or selection criteria 418 to correct received text. Error correction data 432 can include one or more filters 432a-432c for correcting errors. The one or more filters can include: (a) one or more filters to correct errors based on input type 432a, shown in FIG. 4 as "F(type)", (b) one or more filters to correct errors based on input source 432b, shown in FIG. 4 as "F(src)", and/or (c) one or more filters to correct errors based on input context 432c, shown in FIG. 4 as "F(con)." In some embodiments not shown in FIG. 4, some or all of filters 432a-432c can be combined; for example, a source-context filter can combine filter(s) based on input source and filter(s) based on input context. Other filters are possible as well.

The received text can be evaluated for applying type-based corrections using input type filters 432a. This filter can include a list, table, tree, trie, dictionary, database, and/or other data structure(s) configured to store at least one input word and corresponding correction(s) for the input word. Then, error correction module 430 can find possible corrections for each word in the input text by looking up the each word in the input text in the data structure(s) storing the known corrections, and replacing the input word with any correction(s).

For example, speech of "Get dog picture" can be received at microphone 408 and converted to text by speech-to-text module 426. Consider the example where the text generated by text-to-speech module 426 is "Get dog pitcher." Upon receiving the "Get dog pitcher" text, error correction module 430 can evaluate the received text and provide corrected text in response. In this example, the input type is speech received via microphone 408. Based on this input type, error correction module 430 can then determine that the appropriate input type filter 432a is a microphone-related filter and then provide each input word to the microphone-related filter. For instance, suppose that speech-to-text module 426 frequently generated the word "pitcher" instead of the word "picture" for input coming from microphone 408. Then, in response to input text with the word "pitcher," the microphone-related filter can provide a possible correction of "picture."

Additional or other filters can be applied to the input text. Input source filter(s) 432*b* include filters that take an input source, such as a particular speaker, typist, or touch-pad user, into account. Input context filter(s) 432*c* can evaluate the input text in view of historical context 424 to provide possible corrections to the text. Contexts are discussed in more detail in at least the "Selection of Content Based on Context Information" section below. In some embodiments, input context filters 432*c* can be utilized by context evaluation module 420 to correct documents and/or other components of historical context 424.

The possible correction(s) can be applied automatically or manually. Automatic correction techniques involve text correction without external input. For example, suppose the only correction to the "Get dog pitcher" input was to change the word "pitcher" to "picture." An example automatic correction technique can replace the word "pitcher" with "picture" without prompting a user or otherwise receiving external input. Upon applying the automatic correction technique, the corresponding text segment of "Get dog picture" can be output as corrected text.

Manual correction techniques involve providing a number of correction options, and then correcting text based on a selection of one of the correction options. For example, suppose the only correction to the "Get dog pitcher" input was to change the word "pitcher" to "picture." An example manual technique can generate a prompt with the input text of "Get dog pitcher" and a request for input such as "Do you want to replace 'pitcher' with 'picture'?" In response to displaying the prompt, system 400 can receive input, via one or more of input devices 404, related to whether or not to replace the word "pitcher" with "picture" and generate the corresponding output text segment based on the decision. In some embodiments, the prompt may not include the input text; rather the prompt may provide option(s) for correction only.

In some embodiments, part or all of the functionality of one or more of the herein-described modules 416, 420, 426, 430, selection criteria 418, and historical context 424 can be combined with one or more other modules. For example, the part or all of the functionality of error correction module 430 can be combined with context evaluation module 420 (or vice versa).

Prompts, corrections, and/or text segments can be displayed using HMD 401 and/or on another display device (not shown in FIG. 4). In embodiments not depicted in FIG. 4, output can be provided to other devices than HMD 401; for example, output can be communicated via communication link 140. As another example, if system 400 is equipped with speaker(s), earphone(s), and/or earphone jack(s), audio output can be provided via the speaker(s), earphone(s), and/or earphone jack(s). Many other examples and/or outputs are possible as well.

Selection of Input Content Based on Implicit Information

System 400 can select an input based on implicit information extracted from input data from the various possible input devices. This implicit information may correspond to certain data patterns in the input data.

When system 400 includes a microphone or other audio sensor as an input device, input selection module 416 may monitor incoming audio data for various data patterns, according to the input-selection criteria. The input-selection criteria may specify numerous types of data patterns, which may vary in complexity and/or form.

For example, input selection module 416 may monitor audio data for: (i) patterns that are indicative of human speech in general, (ii) patterns that are indicative of human speech by a particular person (e.g., the owner of the device, or a friend or spouse of the owner), (iii) patterns that are indicative of a certain type of human speech (e.g., a question or a command), (iv) patterns that are indicative of human speech inflected with a certain emotion (e.g., angry speech, happy speech, sad speech, and so on), (v) patterns that are indicative of human speech associated with a certain context (e.g., a pre-recorded announcement on a subway car or a statement typically given by a flight attendant on an airplane), (vi) patterns that are indicative of a certain type of human speech (e.g., speech that is not in a speaker's native language), (vii) patterns indicative of certain types of non-speech audio (e.g., music) and/or of non-speech audio with certain characteristics (e.g., a particular genre of music), and/or (viii) other types of audio-data patterns.

As a specific example, a system may be configured to monitor audio data for data patterns that include or are indicative of speech by a particular user associated with the system (e.g., the owner of a wearable computer). Accordingly, the speech-to-text module 426 may convert the speech to corresponding text, which may then be displayed.

In some embodiments, the audio data in which speech is detected may be analyzed in order to verify that the speech is actually that of the user associated with the system. For example, the audio data can be compared to previously-received samples of audio data known to be utterances of the user associated with the system to verify that a speaker is (or is not) the user associated with the system. In particular embodiments, a "voiceprint" or template of the voice of the user associated with the system can be generated, and compared to a voiceprint generated from input audio data. Other techniques for verifying speaker(s) are possible as well.

Further, when speech is detected, and possibly in other scenarios as well, the detected speech may be analyzed for information that may imply certain content might be desirable. For instance, when a speaker says a person's name, error correction module 430 can generate command(s) to search various sources for the named person's contact information or other information related to the named person. Error correction module 430 may perform one or more implicit searches, for example, when the person's name is stated in the midst of a conversation, and the user does not explicitly request the information about the person. Implicit searches can be performed for other types of content, such as other proper nouns, repeated words, unusual words, and/or other words.

If contact information for the named person is located, error correction module 430 can indicate that the contact information may be displayed. For example, the contact information can include phone number(s), email address(es), mailing address(es), images/video related to the contact, and/or social networking information. Furthermore, the contact information may be displayed in various forms—the contact information can be displayed visually (e.g., using HMD 401) and/or audibly (e.g., using a text-to-speech module, not shown in FIG. 4, in combination with an audio output, such as a speaker or earphone not shown in FIG. 4). Many other types of contact information are possible as well.

In the event that analysis of the speech does not provide implicit information that can be used to select an input device, text corresponding to the detected speech can be displayed.

Alternatively, the default action may be not to display anything related to the detected speech. Other default actions are also possible.

Selection of Content Based on Context Information

In a further aspect, input selection module 416 may be configured to select an input device and/or to select input content based on context. In order to use context information in the selection process, input selection module 416 may coordinate with context evaluation module 420, which is configured to evaluate context signals from one or more context information sources 422. For example, context evaluation module 420 may determine a context, and then relay the determined context to input selection module 416. In some cases, input selection module 416 can provide the context to another module; e.g., speech evaluation module 430. In some cases, the context can be a location-sensitive context.

In an example embodiment, context evaluation module 420 may determine contexts, including location-sensitive contexts, using various "context signals," which may be any signals or information pertaining to the state or the environment surrounding the system or a user associated with the system. As such, a wearable computer may be configured to receive one or more context signals, such as location signals, time signals, environmental signals, and so on. These context signals may be received from, or derived from information received from, context information sources 422 and/or other sources.

Many types of information, from many different sources, may serve as context signals or provide information from which context signals may be derived. For example, context signals may include: (a) the current time, (b) the current date, (c) the current day of the week, (d) the current month, (e) the current season, (f) a time of a future event, (g) a date of a future event or future user-context, (h) a day of the week of a future event or future user-context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on user's calendar, information available via a user's social networking account, and/or other context signals or sources of context information, (z) health statistics or characterizations of a user's current health (e.g., whether a user has a fever or whether a user just woke up from being asleep), (aa) items a user has indicated a need for in the past or has gone back to get in the recent past, (bb) items a user currently has (e.g., having a beach towel makes it more likely that a user should also have sunscreen), and (cc) a user's recent context as determined from sensors on or near the user and/or other sources of context information. Those skilled in the art will understand that the above list of possible context signals and sources of context information is not intended to be limiting, and that other context signals and/or sources of context information are possible in addition, or in the alternative, to those listed above.

In some embodiments, context evaluation module 420 may identify the context as a quantitative or qualitative value of one context signal (e.g., the time of the day, a current location, a user status). The context may also be determined based on a plurality of context signals (e.g., the time of day, the day of the week, and the location of the user). In other embodiments, the context evaluation module 420 may extrapolate from the information provided by context signals. For example, a determined user-context may be determined, in part, based on context signals that are provided by a user (e.g., a label for a location such as "work" or "home", or user-provided status information such as "on vacation").

In a further aspect, context information sources 422 may include various sensors that provide context information. These sensors may be included as part of or communicatively coupled to system 400. Examples of such sensors include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, and/or a digital camera, among others.

System 400 may also be configured to acquire context signals from various data sources. For example, context evaluation module 420 can be configured to derive information from network-based weather-report feeds, news feeds and/or financial-market feeds, and/or a system clock providing a reference for time-based context signals. As another example, a location-sensitive context can determine a location for the context using a location-determining system (e.g., location sensor 434), among others.

In another aspect, system 400 may also be configured to learn over time about a user's preferences in certain contexts, and to update selection criteria 418 accordingly. For example, whenever an explicit input-content instruction is received, a corresponding entry may be created in historical context database 424. This entry may include the input device and/or input content indicated by the input-content instruction, as well as context information that is available at or near the receipt of the input-content instruction. Context evaluation module 420 may periodically evaluate historical context database 424 and determine a correlation exists between explicit instructions to select a certain input device and/or certain input content, and a certain context. When such a correlation exists, selection criteria 418 may be updated to specify that the input device should be automatically selected, and/or that the input content should be automatically displayed, upon detection of the corresponding context.

Additionally or alternatively, system 400 may be configured for an "on-the-fly" determination of whether a current context has historically been associated with certain input devices and/or certain input content. In particular, context evaluation module 420 may compare a current context to historical context data in historical context database 424, and determine whether certain content historically has been correlated with the current context. If a correlation is found, then context evaluation module 420 may automatically display the associated input content.

For example, suppose a user of system 400 typically orders lunch from one of seven restaurants between 12:00 and 12:30 while at work. Then, context evaluation module 420 can determine that the context include (a) a location of system 400 is related to "work" (b) a time just before or at 12:00, (c) a history of ordering lunch from the aforementioned seven restaurants, and (c) that six of the seven restaurants are open at this time, based on online listings. Then, the context evaluation module 420 can generate a command to display a reminder to "Order Lunch" with a list of the six open restaurants for order selection, and perhaps including information indicating that the seventh restaurant is closed. In response, the user can select a restaurant from the list using input devices 404, choose another restaurant, dismiss/postpone the order, or perhaps, perform some other action.

As another example, when error correction module 430 detects an "open" speech action followed by a file name, error correction module 430 may select the particular application that is appropriate to open the file as the input device, launch the selected application in the multimode input field, and then open the named file using the application. As an additional example, the user may say "search" and then state or type the terms to be searched, or identify other content to be searched, such as an image, for example. When error correction module 430 detects such a "search" action, it may responsively form a query to a search engine, provide the query with subsequently stated terms or identified content, and receive search results in response to the query. Implicit searches also can be performed by this technique of forming a query based on identified content; e.g., the word(s) that provoked the implicit search, providing the query with identified content to a search engine, and receiving search results in response to the query.

In some scenarios, context evaluation module 420 and/or error correction module 430 can be provide predictive corrections based on context. For example, suppose system 400 is traveling northbound on Highway 101 in San Mateo, Calif., and receives text input of "Franciso airport." Then, error correction module 430 can predict that, based on the location and direction of travel, that possible text corrections can include "San Francisco airport" or "SFO."

As another example of predictive correction, suppose that, typically, the user of system 400 buys groceries on the way home from work between 5:15 PM and 6:30 PM. Then, by knowing this context of work followed by grocery store, system 400 can weight grocery-related corrections higher between 5 PM and 6:30 PM. For example, in this scenario, suppose system 400 receives text input of "stak" at 3 PM and again receives text input of "stak" at 5:10 PM. At 3 PM, the input of "stak" may lead to a text correction of "stake" being more highly weighted than a text correction of "steak", while at 5:10 PM, the input of "stak" may have a text correction of "steak" being more highly weighted than a text correction of "stake." Many other examples of predictive correction are possible as well.

Historical context database 424 can also, or instead, include information about one or more documents for inclusion in a context. A document can be a bounded physical or digital representation of a body of information, or content. Content of the document can include text, images, video, audio, multi-media content, and/or other types of content. Document-property information can be associated with a document, such as, but not limited to, document names, sizes, locations, references, partial or complete content of documents, criteria for selecting documents to form a context and/or to locate a document. Other types of content and document-property information are possible as well. In some embodiments, documents, including content and/or document-property information, can be stored in historical context database 424 for at least use in context generation.

A context may involve information derived from collection(s) of documents, such as, but not limited to, related collections of documents and past documents that have been created by the user and/or by other users. For example, based on the fact that a user has created a number of purchase order documents in the past, a background process may interpret the document in the context of a purchase order agreement, perhaps searching for supplier names and/or supplier part numbers as data for search request(s).

In some cases, a document can be accessed via one or more document references such as, but not limited to, a Uniform Resource Locator (URL), a Uniform Resource Identifier (URI), a volume name/number, a title, a page number, an address, a storage address, such as a memory address or disk sector, a library index number, an International Standard Book Number (ISBN), a bar code, and/or other identifying information. One or more document references can be included with the document-property information about the document. Other document references are possible as well.

Example Scenarios for Error Correction

Figure 5A:
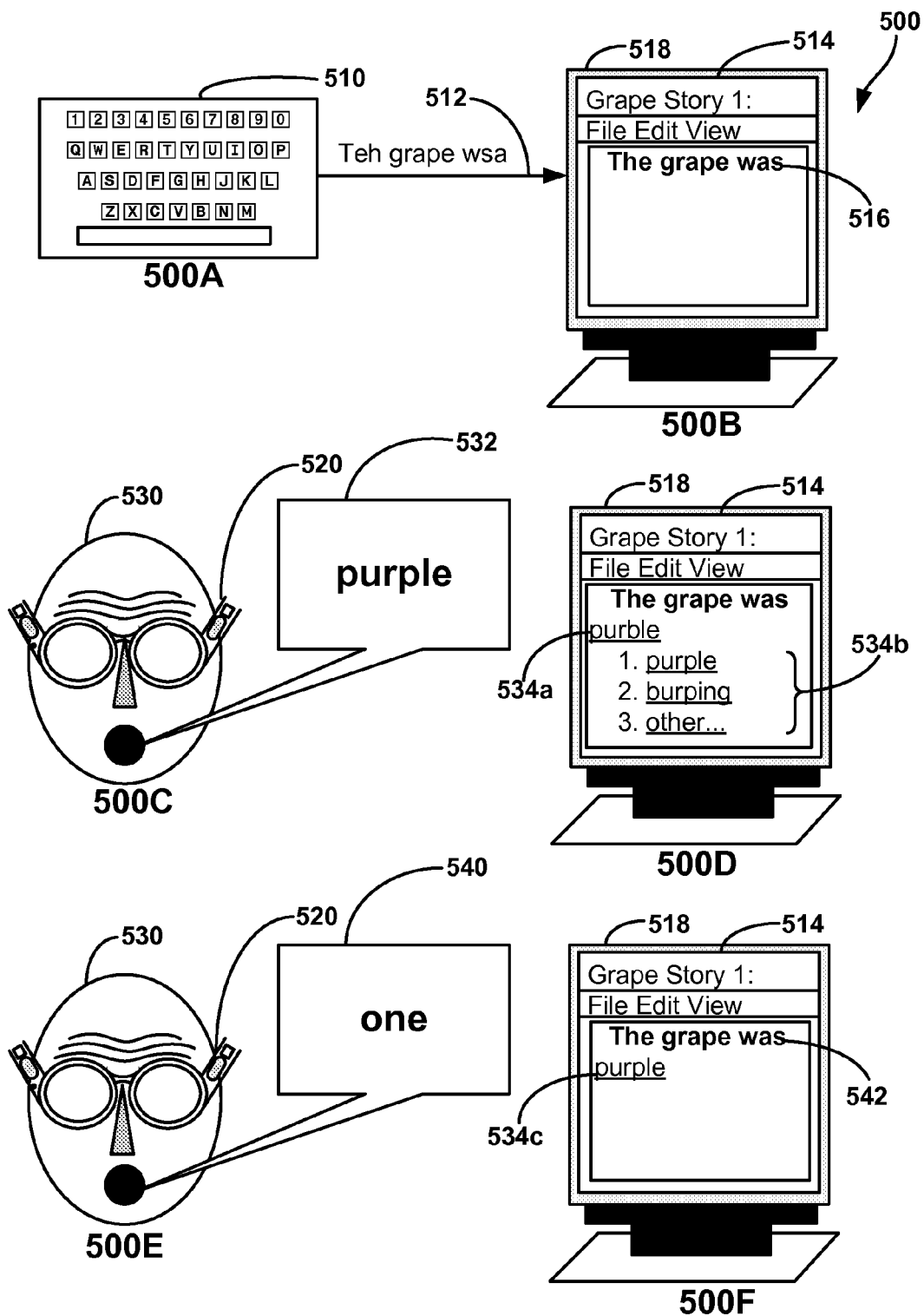
FIG. 5A depicts a first scenario of error correction in accordance with an example embodiment.

FIG. 5A depicts a scenario 500 of error correction in accordance with an example embodiment. Scenario 500 begins at 500A where keyboard 510 is used to generate text input 512 of "Teh grape wsa." Text input 512 is received at device 520 (shown in FIG. 5A at 500C and 500E). An example wearable computing device that could be utilized as device 520 is system 400, described in detail above with reference to FIG. 4. Text input 512 is processed by error correction module 530 to generate corrected text segment 516, shown at 500B of FIG. 5. Also at 500B, corrected text segment 516 of "The grape was" is shown as being added to open document 514, shown in FIG. 5A as entitled as "Grape Story 1."

FIG. 5A shows document 514 with corrected text segment 516 displayed on display 518. Display 518 can be controlled by device 520; for example, using a wireless display controller on device 520 configured to send commands to drive display 518 equipped with a compatible wireless receiver. In embodiments not shown in FIG. 5A, document 514 can be displayed using a projector of device 520, such as projector 128 and/or 132 discussed above in the context of FIG. 1.

At 500C of FIG. 5A, speaker 530 wearing device 520 speaks utterance 532 of "purple." A microphone or other sound sensor associated with device 520 can receive utterance 532 and convert received utterance 532 into text; e.g., using speech-to-text module 426. In scenario 500, speech-to-text module 426 generates text 534a of "purble" corresponding to utterance 532. Upon receiving text input 534a related to utterance 532, error correction module 530 can generate a corrected text segment corresponding to text input 534a, and add the corrected text segment to document 514.

FIG. 5A shows corrected text segment as a list 534b of three possible corrected text segments: 1. purple, 2. burping, and 3. other . . . . That is, list 534b is part of an example of a manual correction technique, where speaker 530 is asked to choose between a number of different possible error corrections. In contrast, corrected text segment 516 is shown as being generated using an automated correction technique, as no additional input was required to generate corrected text segment 516 from input text 512.

At 500D and throughout FIG. 5A, text related to keyboard input is shown using a bold font, while text related to speech input, both as input and as corrected, is shown using underlining. Generally, text of various input types and/or input sources can be distinguished from each other using different fonts, color, font sizes, and/or spacing. For example, text of one input type can be displayed using a first color (e.g., blue) and text of a second input type can be displayed using a second color (e.g., red). In particular embodiments, distinguishing text from different input types and/or input sources can be temporary; for example, as inputs are received they can be displayed using their distinguishing characteristics of font, color, size, etc. for a pre-determined amount of time; e.g., 5 or 10 seconds, before the text is shown as non-distinguished text. Other techniques for distinguishing text are possible as well.

At 500E of FIG. 5A, speaker 530 speaks utterance 540 of "one." Utterance 540 can be converted to text via speech-to-text-module 426 and text input of "one" can be provided to error correction module 430. Upon receiving text input of "one," error correction module 430, performing a manual correction technique, can associate the text input with the first displayed item in the list 534a, which is the word "purple." Then, error correction module 430 can request the word "purple" be added to segment 534b of document 514. FIG. 5C shows the result of the manual correction technique with document 514 including phrase 542 of "The grape was purple."

Figure 5B:
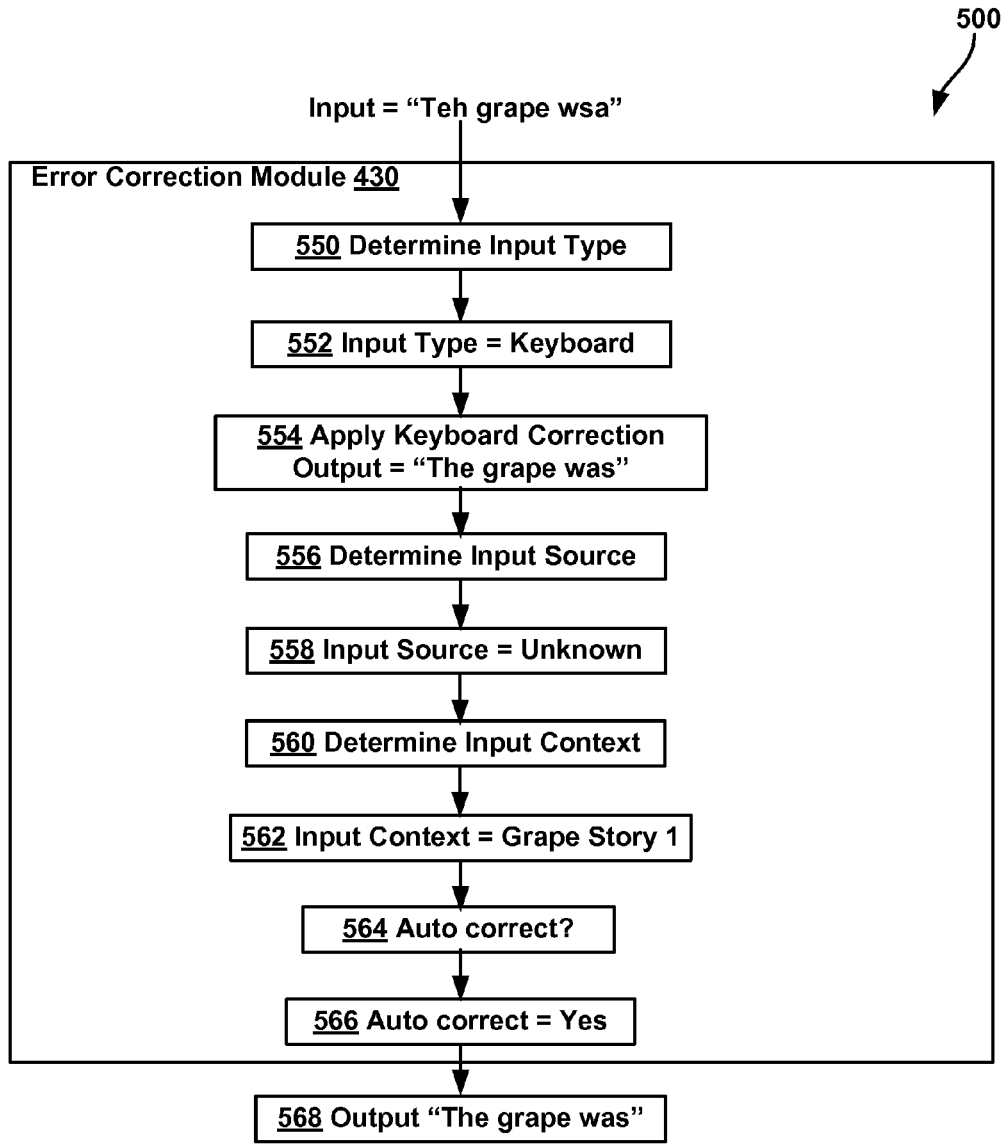
FIGS. 5B, 5C, and 5D depict processing by an error correction module for the inputs received in the first scenario in accordance with an example embodiment.
Figure 5C:
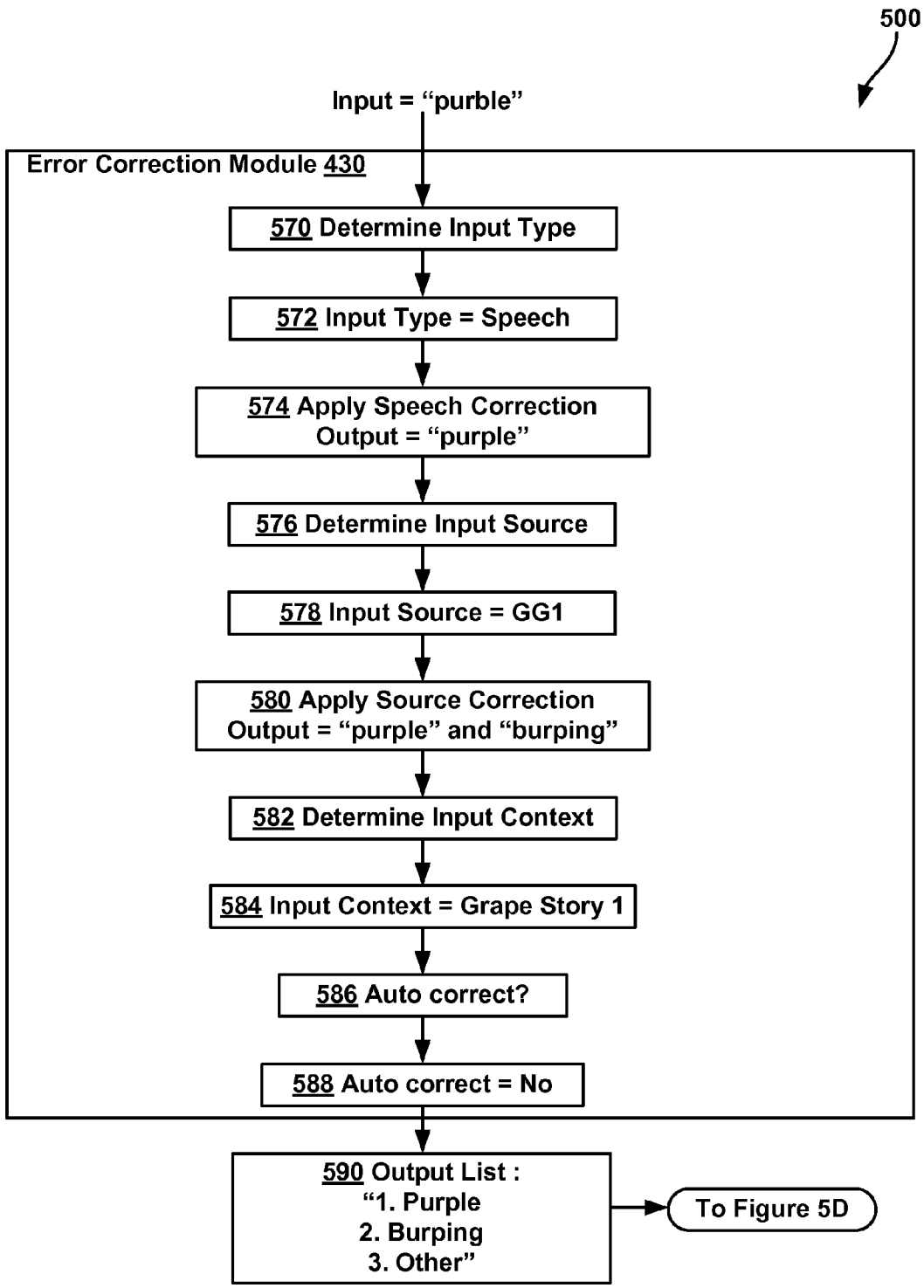
Figure 5D:
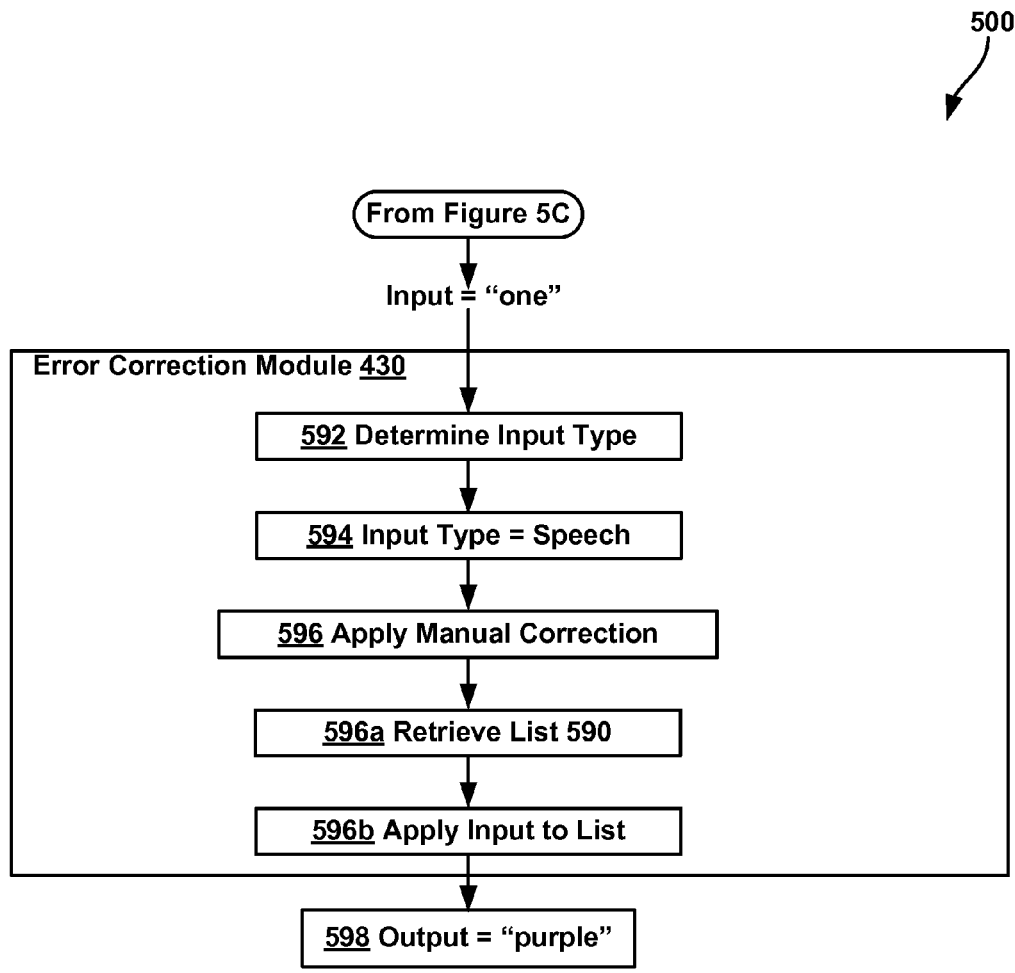

FIGS. 5B, 5C, and 5D depict processing by error correction module 430 for inputs received in scenario 500 in accordance with an example embodiment. Turning to FIG. 5B, at block 550, error correction module 430 determines an input type for input text of "Teh grape wsa". At block 552, the input type is determined as a "keyboard." The input type can be determined by adding a input-type tag and/or other data to input data received at input sources 404—e.g., for input received by application 406, the input-type tag can be "application," for input received by microphone 408, the input-type tag can be "microphone," and so on. Many other techniques for determining an input type associated with an input are possible as well.

FIG. 5B shows, at block 554, that error correction module 430 applies a correction based on the keyboard input type. The correction can involve utilizing a filter for the keyboard input type on each of the three input words: "Teh", "grape", and "wsa." After applying the filter, FIG. 5B shows an output of "The grape was".

At block 556, error correction module 430 can determine an input source for the input of "Teh grape wsa". The input source can be determined using an input-source tag similar to the input-type tag described above. For example, if a user logs in or is otherwise identified, an input-type tag can be populated with the identified user information. As another example, if speech or video is used as input, an input source can be determined by data associated with the input, metadata associated with the input, speech and/or facial recognition techniques applied to the input audio and/or video. In scenario 500, the input source for the "Teh grape wsa" input is unknown, as indicated in block 558. As the input source is unknown, error correction module 430 may not apply any corrections to this input based on input source.

At block 560, an input context is determined. As discussed above in the context of FIG. 4, the input context can include context signals, context information derived from sensors, user preferences, documents, document-property information, and/or historical context database. In scenario 500, the input context is merely that of a current document "Grape Story 1", as indicated at block 562. As this input context is an empty document, no corrections are performed based on the input context.

At block 564, a determination is made as to whether or not to apply an automatic correction technique. In some embodiments, the determination to apply an automatic correction technique can be based on input type, input source, input context, user preferences, and/or other information. For example, a number of possible corrections for the input text can be determined, and automatic techniques can be used when there is only one or fewer possible corrections per word to be applied, while manual techniques can be used when there are multiple possible corrections to be applied to at least one word, such as shown at 500D of FIG. 5A.

FIG. 5B shows that an automatic correction technique is to be used at block 566. As such, a corrected text segment of "The grape was", which is the output of block 554, is the output of error correction module 430 at block 568. The corrected text segment can replace the input text of "Teh grape wsa" in the "Grape Story 1" document.

Now turning to FIG. 5C, which shows an input to error correction module 430 of "purble" that was generated from utterance 532 of FIG. 5A. At block 570, error correction module 430 determines an input type for the "purble" input text. At block 572, the input type is determined to be "speech."

At block 574, error correction module 430 applies a correction based on the speech input type. The correction can involve utilizing a filter for the speech input type for the input word of "purble." After applying the input-type filter, FIG. 5B shows an output of "purple."

At block 576, error correction module 430 can determine an input source for the input of "purble." In scenario 500, the input source for the "purble" input is a user with username of "GG1" as shown in block 578 of FIG. 5C. An input-source filter based on the GG1 input source can be applied to the input at block 580. In some embodiments, the input-source filter can take both the input source (e.g., GG1) and the input type (e.g., speech) into account—that is, the input-source filter can account for errors based on both source and type.

In some embodiments, the filter act as a reverse filter; that is, taking output text, such as output from a speech-to-text or video-to-text module, as an input and then determining the corresponding input that could lead to the "output" text. For example, suppose that user GG1 typically types the word "purple" as "pruple" and that speech-to-text conversion typically converts the word "burping" spoken by GG1 to "purple." Then, after applying the input-source filter with the output text of "purble" as an input and an input type of speech, an output list of corrections can have at least two words: "purple" as generated at block 574, and "burping" as generated at block 580.

At block 582, an input context is determined. FIG. 5B shows that an input context of a current document "Grape Story 1" is formed at block 584. As this input context now only includes the words "The grape was", no corrections are performed based on the input context.

FIG. 5C shows that at block 586, a determination is made as to whether or not to apply an automatic correction technique. At block 588, the determination is not to use the automatic correction technique; therefore, a manual correction technique is used. Then, as a manual correction technique is used, at block 590 an output list is presented. FIG. 5C shows that the output list includes three options: "purple," "burping," and "other." In some manual correction technique scenarios, the "other" option can be omitted.

In scenarios other than scenario 500, the "other" option is selected. When the "other" option is selected, additional input can be requested to correct the text; e.g., a prompt such as "Replace purble with what word(s)?" Then, upon receiving additional text related to the additional input, error correction module 430 can correct the input text using the additional text.

Turning to FIG. 5D, an input of "one" is received. As an input is expected for the manual correction technique, error correction module 430 can apply the input as part of the manual correction technique. At block 592, the input type is determined, which is shown at block 594 to be "speech." In scenario 500, consider that the input of "one" is correctly converted to input text of "one."

At block 596, the manual correction technique is applied using input text of "one." At block 596a, the list generated at block 590 is retrieved. At block 596b, the input text applied to the list to determine the correction; that is, the word in the list associated with the input text, which is "purple," is determined to be the correction word. FIG. 5D shows that, at block 598, the word "purple" is output as the output of the manual correction technique.

In some scenarios not shown in FIGS. 5A-D, multiple output words can be generated for one input word. For example, for a keyboard input of "canyoudigit", error correction module 430 can generate corrections with multiple output words, such as "can you dig it" and "can you digit", as possible replacements for the "canyoudigit" input.

Figure 6:
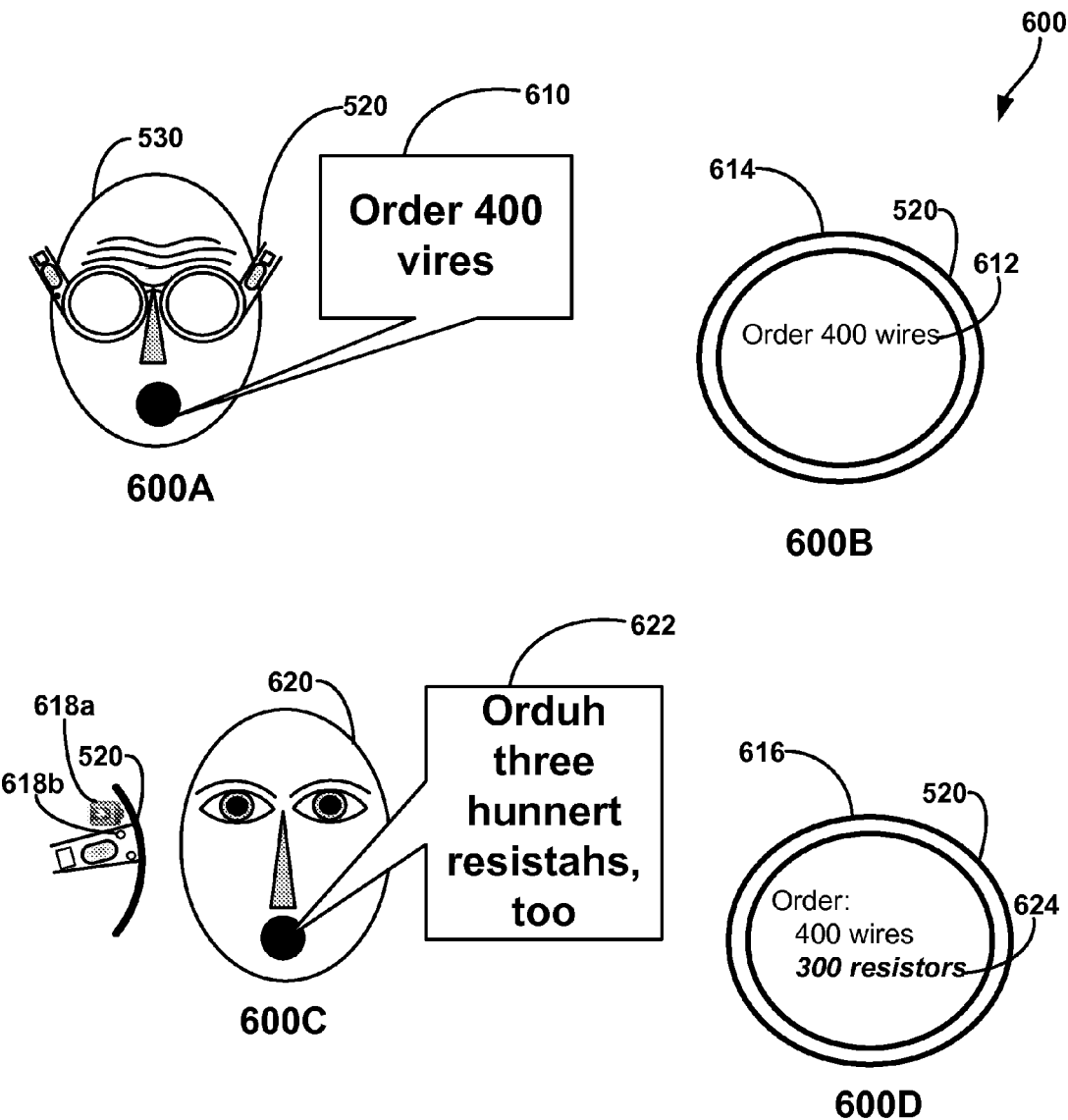
FIG. 6 depicts a second scenario of error correction in accordance with an example embodiment.

FIG. 6 depicts a scenario 600 of error correction in accordance with an example embodiment. Scenario 600 begins at 600A with speaker 520 instructing device 530 using utterance 610 of "Order 400 vires."

Upon receiving utterance 610, error correction module 430 of device 520 can receive input text corresponding to utterance 610. In scenario 600, the input text is "Order 400 vires." Error correction module can apply input-type and/or input-source filters to the input text, as discussed above with reference to FIGS. 5B, 5C, and 5D. As similarly indicated in scenario 500, the input context of scenario 600 appears to be empty, so error correction module 430 may determine that input-context filters are not to be applied. After applying the input-type and/or input-source filters, the input text can be corrected, and the corresponding text of "Order 400 wires" can be output. At 600B, FIG. 6 shows that device 520 shows corrected text 612 of "Order 400 wires" displayed on lens/display 614 of device 520.

At 600C, FIG. 6 shows device 520 with camera 618a and microphone 618b observing speaker 620 speaking utterance 622 of "Orduh three hunnert resistahs, too." Input text can be generated from inputs from both camera 618a and microphone 618b. For example, input text can be generated from video input generated by camera 618a using automated lip-reading and/or facial motion techniques. Other techniques can be used as well.

Input texts from camera 618a and microphone 618b can be compared to find similarities and differences. Where the two input texts are similar, error correction module 430 can determine that the corrected output is likely to involve similar words; while error correction module 430 can determine that errors are more likely where the two input texts are different. Error correction module 430 can apply input-type and/or input-source filters to the input text, as discussed above with reference to FIGS. 5B, 5C, and 5D.

However, as there is an input context of an "order", an input-context filter can be used to correct utterance 622. For example, based on the input context, error correction module 430 can determine the word "orduh" of utterance 622 is more likely to be the word "order." Further, in the context of an already-begun order, error correction module 430 can indicate that the final word of utterance 622 is the word "too" as opposed to "to" or "two."

Figure 600D shows that, after applying input-type, input-source filters, and/or input-context filters, text 624 of "300 resistors" is generated and displayed on lens/display 616 of device 520.

Figure 7:
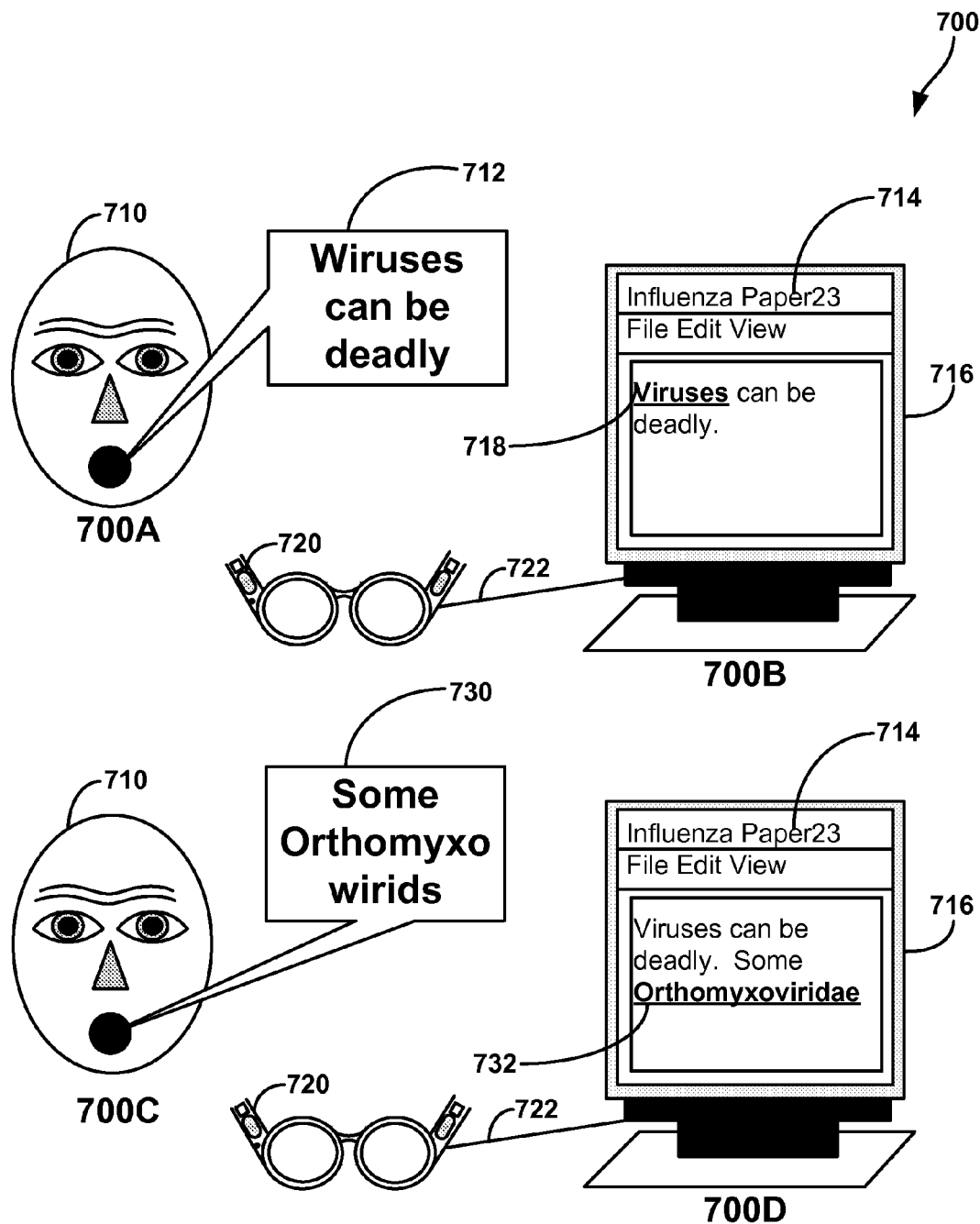
FIG. 7 depicts a third scenario of error correction in accordance with an example embodiment.

FIG. 7 depicts a scenario 700 of error correction in accordance with an example embodiment. Scenario 700 begins at 700A with speaker 710 composing a document via utterance 712 of "Wiruses can be deadly." Utterance 710 can be received by wearable computing device 720, which can be an embodiment of system 400 configured with an output port configured to connect to and drive device 716 via connection 722. For example, utterance 710 can be received by a microphone of device 720 and converted to text by a speech-to-text module. Error correction module 430 of device 720 can receive the text corresponding to utterance 712, which in scenario 700 is "Wiruses can be deadly."

Figure 700B shows that the document 714 being composed is entitled "Influenza Paper23." In scenario 700, the input context can include document 714 as well as other papers on influenza (e.g., Influenza Papers 1 through 22) edited by speaker 710, papers not edited by speaker 710, additional documents on influenza, web pages on viruses (including the influenza viruses), and other types of information about influenza and viruses.

Error correction module 430 can apply input-type, input-source, and/or input-context filters to the input text of "Wiruses can be deadly," as discussed above with reference to FIGS. 5B, 5C, and 5D. In particular, input-source and/or input-context filters can correct the word "Wiruses" to be "Viruses." After applying the input-type, input-source, and/or input-context filters, the input text can be corrected, and the corresponding text of "Viruses can be deadly" can be output to document 714 displayed on display 716.

At 700B of FIG. 7, corrected text 718 is shown as being distinguished in document 714 via use of bold and underlined font. Other techniques for distinguishing corrected text are possible as well; for example as discussed above in the context of FIG. 5A for distinguishing text of different input sources and/or types. In particular embodiments, distinguishing corrected text can be temporary; for example, the corrected text 718 of "Viruses" can appear with bold and underlined font for a predetermined period of time; e.g., 5 or 10 seconds, before the corrected text 718 is shown as not-distinguished text.

At 700C of FIG. 7, speaker 710 speaks utterance 730 of "Some Orthomyxowirids" which is received at a microphone of device 720 and converted to text and provided to error correction module 430 as "Some Orthomyxowirids." Error correction module 430 can apply input-type, input-source, and/or input-context filters to the input text of "Some Orthomyxowirids", as discussed above with reference to FIGS. 5B, 5C, and 5D. In particular, error correction module 430 can determine based on input context that the word "Orthomyxowirids" corresponds to the plural of the influenza virus, or Orthomyxoviridae, and correspondingly correct utterance 730 to be "Some Orthomyxoviridae." At 700D of FIG. 7, corrected text 734 of "Orthomyxoviridae" is shown inserted into document 714 and distinguished via use of bold and underlined font.

Figure 8A:
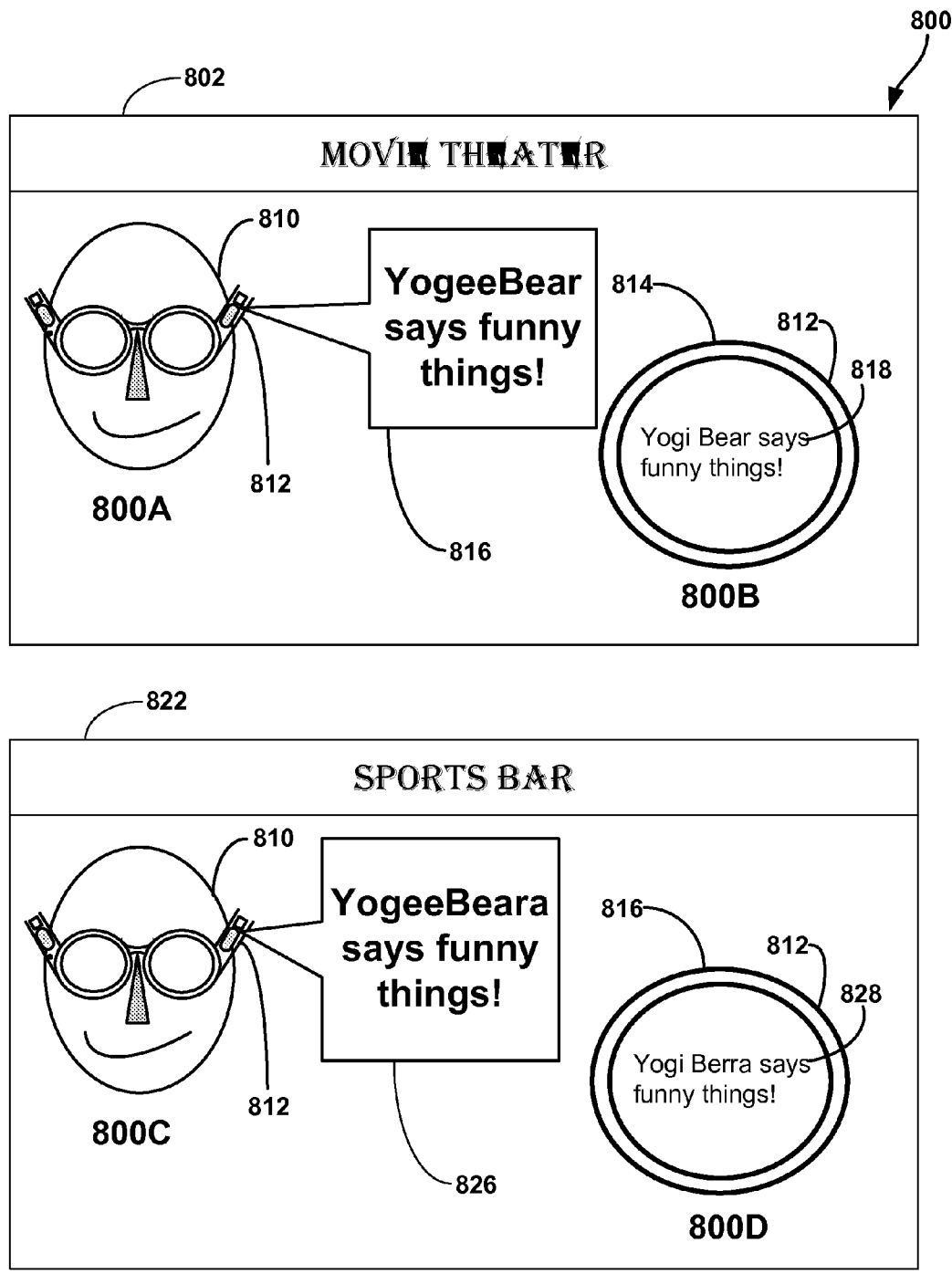
FIG. 8A depicts a fourth scenario of error correction in accordance with an example embodiment.
Figure 8B:
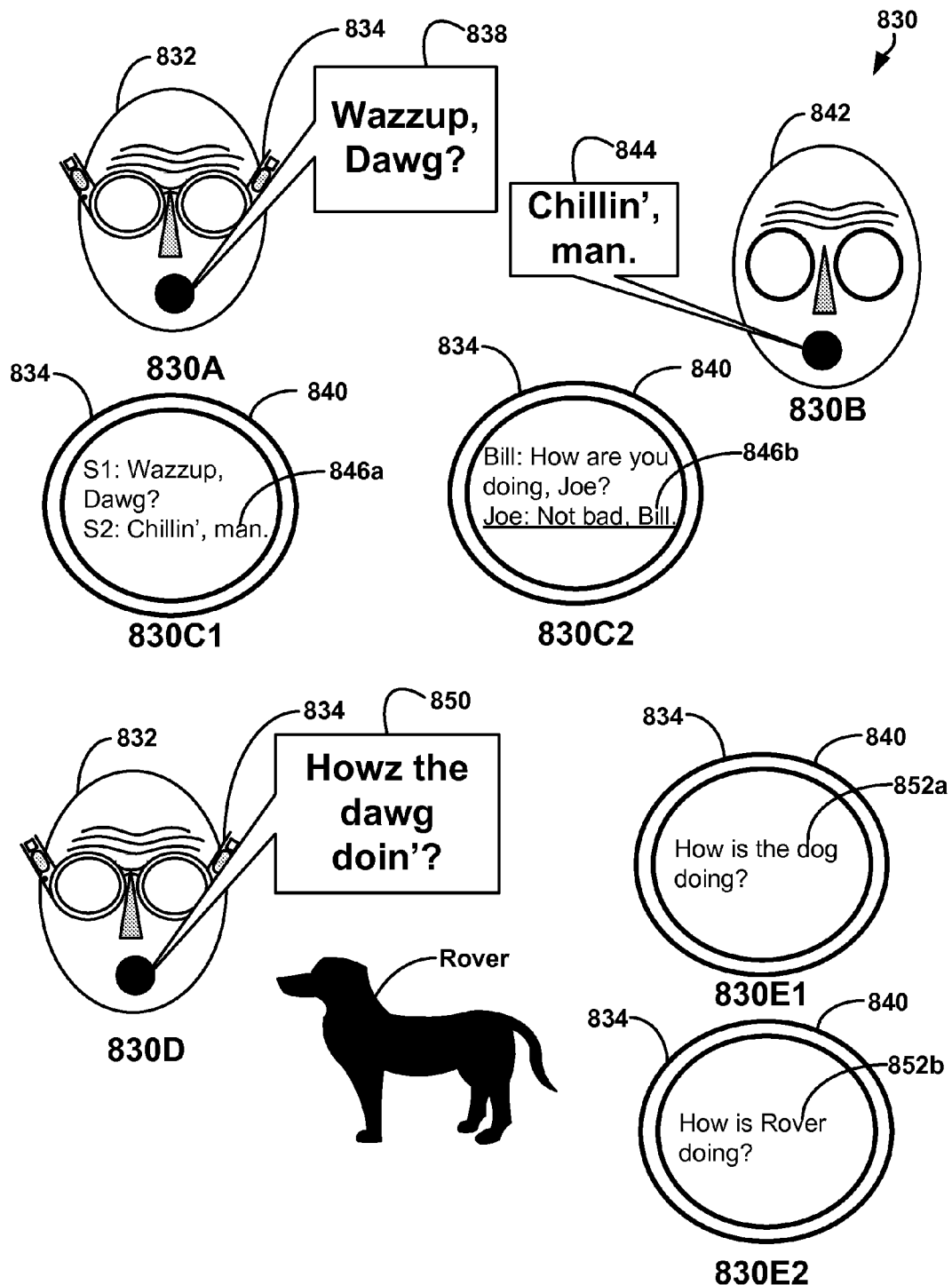
FIG. 8B depicts a firth scenario of error correction in accordance with an example embodiment.
Figure 8C:
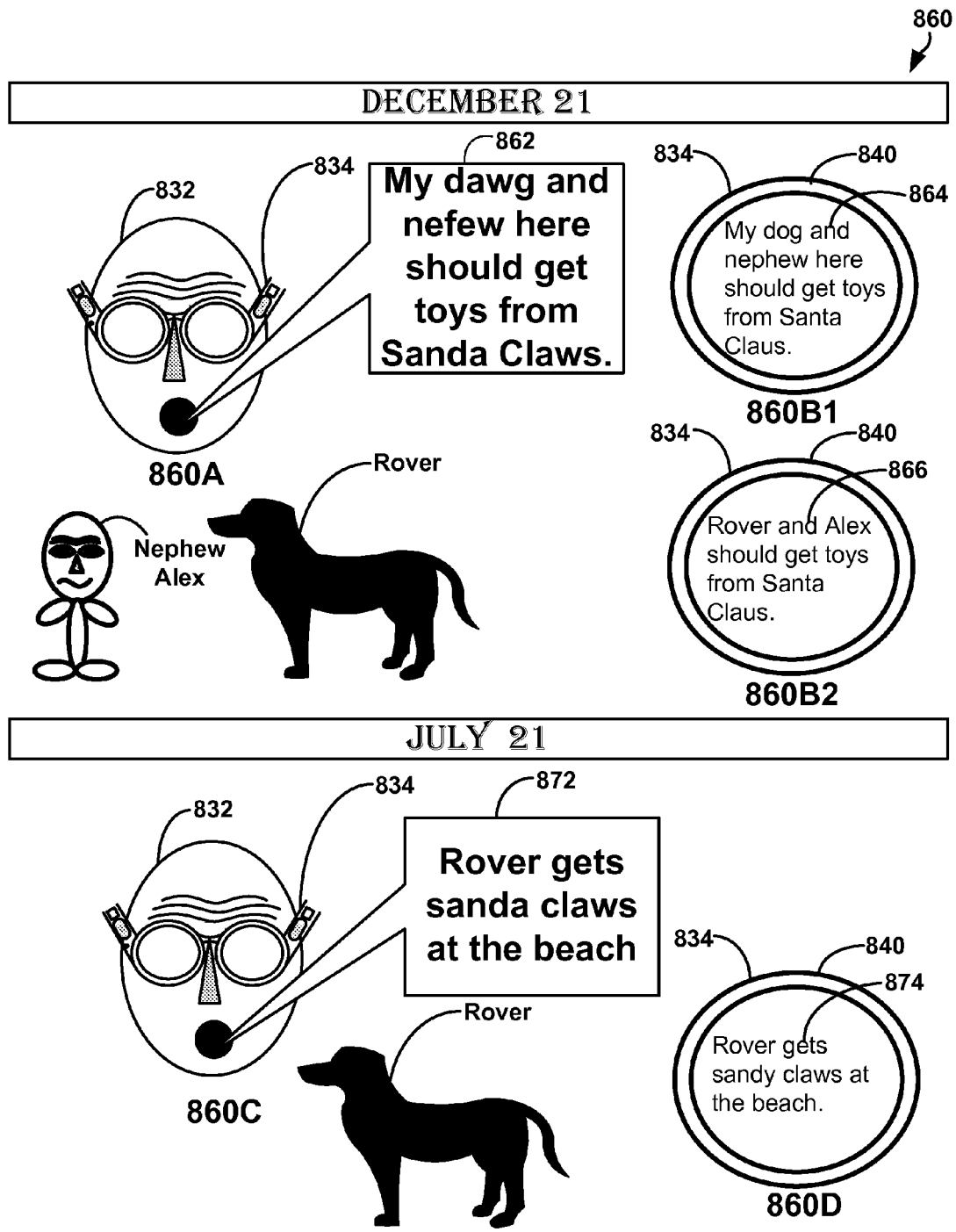
FIG. 8C depicts a sixth scenario of error correction in accordance with an example embodiment.

FIGS. 8A, 8B, and 8C each depict scenarios for corrections utilizing contexts. In particular, FIG. 8A depicts a scenario 800 of error correction in accordance with an example embodiment.

Scenario 800 begins with wearer 810 of wearable computing device 812 at movie theater 802. At 800A, utterance 816 is spoken at movie theater 802 and captured by wearable computing device 812. As shown in FIG. 8A, utterance 816 is "YogeeBear says funny things!"

Wearable computing device 812 can utilize a location-sensitive context to correct utterance 816. For example, wearable-computing device 812 can determine a location of wearable computing device 812 utilizing location sensor 434, and further determine that the location of wearable computing device 812 is within university 802. In some embodiments, the location-sensitive context can include time-sensitive information, such as schedules of movies being played at movie theater 802.

Upon determining a building or buildings associated with the location of wearable computing device 812, such as movie theater 802, wearable computing device 812 can determine one or more activities associated with the building(s) as part of the location-sensitive context. For example, activities associated with movie theater 802 can include watching and discussing movies, listening to and discussing movie-related music, talking about activities of other patrons, and enjoying popcorn and other confections. At 800A of FIG. 8A, wearable computing device 812 can determine that utterance 816 is likely associated with a movie. In some embodiments, wearable computing device can determine that the movie "Yogi Bear" and/or cartoons with the Yogi Bear character are playing at the time utterance 816 is captured.

Therefore, wearable computing device 812 can determine one or more speech patterns related to academic exercises, classes, etc., that can indicate the word "YogeeBear" that is part of utterance 816 is likely related to "Yogi Bear".

At 800B of FIG. 8, lens/display 814 of wearable computing device 812 is shown displaying corrected text 818 for utterance 816. FIG. 8A shows that corrected text 816 has corrected "YogeeBear" to be "Yogi Bear", so that corrected text 816 reads "Yogi Bear says funny things!"

Scenario 800 continues with wearer 810 of wearable computing device 812 traveling to sports bar 822. At 800C of FIG. 8A, utterance 826 is received at wearable computing device 812. As shown in FIG. 8A, utterance 826 is "YogeeBeara says funny things."

In correcting utterance 826, wearable computing device 812 can determine a location of wearable computing device 812 utilizing location sensor 434, as discussed above. Then, wearable computing device 812 can determine the location is a location of a sports bar building; e.g., sports bar 822, and determine activities associated with the building. For example, wearable computing device 812 can determine that sports, such as football, baseball, basketball, soccer, hockey, and drinking are activities associated with a sports bar such as sports bar 822.

Then, wearable computing device 812 can determine corrections to utterance 826 using a location-sensitive context that are based on both the location (e.g., sports bar 822) and activities associated with the location (e.g., various sports, drinking, etc.). For example, in the context of a sports bar and the activity of "baseball", wearable computing device 812 can determine one or more baseball-related speech patterns. For example, a baseball-related speech pattern can indicate the word "YogeeBeara" that is part of utterance 816 are likely related to "Yogi Berra," who is a Hall of Frame baseball player known for colorful sayings.

At 800D of FIG. 8A, wearable computing device 812 can generate corrected text 828 of utterance 826 using the location-sensitive context and baseball-related speech patterns. FIG. 8A shows corrected text 828 as "Yogi Berra says funny things!"

In another example not shown in FIG. 8A, wearable computing device 812 can be at a university and capture an utterance of "LBJ wuz a pivotal figure of the 60s." Upon determining that a university is associated with the location of wearable computing device 812, wearable computing device 812 can determine one or more activities with the university as part of the location-sensitive context. For example, one activity associated with university 802 could be United States history, among others. Wearable computing device 812 can determine one or more speech patterns related to United States history can indicate the initials "LBJ" are likely related to "Lyndon B. Johnson", who was the 36$^{th}$ President of the United States. Indeed, this utterance provides context in by saying LBJ was "a pivotal figure of the 60s", as Lyndon B. Johnson was U.S. President from 1963 to 1969.

Examples of corrected text based on this utterance include: "LBJ was a pivotal figure of the 60s," with spelling corrections only, "Lyndon B. Johnson was a pivotal figure of the 60s" with the expansion of the initials "LBJ", and "Lyndon B. Johnson was a pivotal figure of the 1960s" with the expansion of the term "60s." In some embodiments, this corrected text can be added to notes and/or other information about the activity at the university; e.g., a U.S. History lecture.

In other embodiments, user controls can be provided to instruct wearable computing device 812 whether or not verbatim text capture is to be performed, initials and/or other terms are to be expanded, spelling and/or grammar corrections are to be applied, slang/jargon is to be converted to slang/jargon-free language, and other controls as well.

As another example not shown in FIG. 8A, at sports bar 822, an utterance of "LBJ just posterized #38 fer an and one" is captured. Upon determining that sports bar 822 associated with the location of wearable computing device 812, wearable computing device 812 can determine that basketball is associated with sports bar 822, and perhaps determine time-sensitive information such as a basketball game is being played. A basketball-related speech pattern can indicate the initials "LBJ" that are part of the utterance are likely related to "LeBron James", the slang word "posterize" is likely related to dunking a basketball over another player, and the slang phrase "and one" relates to getting fouled as part of a successful shot and getting a free throw for the foul. As such, examples of corrected text of this utterance include "LBJ just posterized #38 for an and one," "LeBron James just posterized #38 for an and one", and "LeBron James just scored over #38 and was fouled during the score."

As yet another example, in some industries, industry-specific jargon is commonly used in the work place. As such, a wearable computing device can access information, such as industry-specific dictionaries and/or databases, to suggest corrections based on industry-specific jargon when located at a work place and/or when proximate to one or more identified co-workers. Such access to industry-specific information can be useful to employees learning work-related jargon while breaking into a new industry and/or to ensure jargon is used correctly. Many other examples are possible as well.

FIG. 8B shows an example scenario 830 for error correction in accordance with an example embodiment. At 830A of FIG. 8B, speaker 832 associated with wearable computing device 834 makes utterance 838 of "Wazzup, Dawg?" At 830B of FIG. 8B, speaker 842 makes utterance 844 of "Chillin' man."

Upon reception of utterance 838, wearable computing device 834 can identify a speaker associated with utterance 838 (e.g., speaker 832) using the techniques for verifying speech discussed above. Upon determining that speaker 832 is associated with utterance 838, wearable computing device 834 can generate a context that includes information about speaker 832, including speech patterns for speaker 832, related documents, information about location(s) associated with wearable computing device 834, and additional information.

Then, upon reception of utterance 844, wearable computing device 834 can determine that another speaker (e.g., speaker 842) is within range of wearable computing device 834. In some cases, a location-sensitive context can be used to account for both speakers 832 and 842. For example, a location-sensitive context can indicate that speakers 832 and 842 are within a threshold distance, or proximity, of wearable computing device 834.

Upon receiving utterances 838 and 844, wearable computing device 834 can generate respective corrected text segments for each utterance. The corrected text segments can capture the text verbatim (modulo some spelling and perhaps grammatical corrections) or can apply corrections on a per-speaker basis.

At block 830C1, corrected text segments 846a are shown on lens/display 840 of wearable computing device 834. Corrected text segments 846a show text as captured verbatim without specific speaker identification. As shown in FIG. 8B, corrected text segments 846a include a first segment "S1: Wazzup, Dawg?" and a second segment "S2: Chillin', man." The labels S1 and S2 in corrected text segments 846a indicate speaker 834 as unidentified speaker 1 and speaker 842 as unidentified speaker 2, respectively. That is, corrected text segments 846a show that the speaker of the first segment differs from the speaker of the second text segment, but neither speaker is specifically identified.

At block 830C2, corrected text segments 846b are shown on lens/display 840 of wearable computing device 834. Corrected text segments 846b show text with speaker identification and taking into account speaker-specific speech patterns. As shown in FIG. 8B, corrected text segments 846b include a first segment "Bill: How are you doing, Joe?" and a second segment "Joe: Not bad, Bill." The labels S1 and S2 in corrected text segments 846a have been replaced by identification information for each speaker; e.g., identifying speaker 834 as "Bill" and speaker 842 as "Joe." In some embodiments, replacement of identification information during text correction can be controlled as part of the user controls mentioned above in the context of FIG. 8A.

Based on this identification of speakers, wearable computing device 834 can correct text based on speaker-specific speech patterns. For example, suppose that Bill (speaker 834) always says "How you doin', Dawg?" when he greets Joe (speaker 842) and that Joe always makes a brief statement of condition (e.g., OK, Not Bad, Not my best, Chillin') in response. Thus, wearable computing device 834 can infer or otherwise determine, such as by performing searches of data related to speech patterns, that "How you doin', Dawg" can be corrected to be "How are you doing?" or "How are you doing, Joe" once utterance 844 has been identified to be associated with Joe.

Similarly, wearable computing device 834 can infer or otherwise determine that "Chillin' man" can be corrected to be "Not bad, Bill." FIG. 8B shows that second segment of corrected text segments 846b with an underline font to clearly indicate that corrected text segment 846b includes text from two separate speakers. As described above, other information, such as color, other fonts, font sizes, spacing, etc. can be used instead or as well as an underlined font to show indicate text from multiple speakers.

Speaker-specific speech patterns can be based on personal conversation histories. For example, suppose that wearer Ace of a wearable computing device, such as system 400, regularly converses with Bull, Cam, Dominic, and Eve and that Ace's conversations with Bull commonly involve the U.S. Civil War, Ace's conversations with Cam commonly involve photography, Ace's conversations with Dominic involve comparative religion, and Ace's conversations with Eve involve music.

During these conversations, system 400 can maintain a history of terminology used as part of a personal conversation history between Ace and each of Ace's conversational partners. Then, upon hearing the utterance "cannon", system 400 can generate the appropriate corrected text. In these examples, for a conversation about the U.S. Civil War with Bull, the corrected text is likely to be "cannon" (a type of artillery piece used during the U.S. Civil War), for a conversation about photography with Cam, the corrected text is likely to be "Canon" (a manufacturer of cameras), for a conversation about comparative religion with Dominic, the corrected text is likely to be "canon" (the laws for the Roman Catholic Church) or "Kannon" (one name for a Buddhist bodhisattva), and for a conversation about music with Eve, the corrected text is likely to be "canon" (a composition with imitations of a melody each played after a given duration). Other examples of personal conversational histories are possible as well.

At 830D of FIG. 8B, speaker 832 is accompanied by a dog, Rover, as shown in FIG. 8B. Scenario 800 shows speaker 830 composing a message using a speech interface to wearable computing device 834. During the composition of the message, speaker 834 emits utterance 850 of "Howz the dawg doin'?"

Upon receiving utterance 850, wearable computing device 834 can generate respective corrected text segments for each utterance. As indicated at 830E1 of FIG. 8B, corrected text segment 852a for utterance 850 is "How is the dog doing?" which includes spelling corrections for the words "Howz" and "dawg".

In some embodiments, wearable-computing device 834 can use determine that another entity, a dog named Rover, is proximate to speaker 832. For example, Rover may have an identifying chip, or speaker 832 may have indicated that Rover is proximate by a previous utterance (e.g., "Come here, Rover.") As such, wearable-computing device 834 can maintain a location-sensitive context that includes the information that one dog, Rover, is proximate to speaker 832.

In some embodiments, wearable computing device 834 can utilize social-networking and/or other network-available information (e.g., general and/or specialized search engines) to identify proximate entities. For example, wearable computing device 834 can identify an image of Rover as an image of a dog and perform searches of social-networking and/or other network-available information about speaker 832 and dogs. In this example, wearable computing device 834 can determine that speaker 832 is associated with a dog named Rover.

Wearable computing device 834 can generate corrected text segment 852b based on this location-sensitive context and speech patterns of speaker 832. As shown at 830E2 of FIG. 8B, display/lens 840 of wearable computing device 834 displays corrected text segment 852b of "How is Rover doing?"

FIG. 8C shows an example scenario 860 for error correction in accordance with an example embodiment. At 860A of FIG. 8C, the date is identified as December 21, and speaker 832, associated with wearable computing device 834, is proximate to a dog, Rover and a nephew, Alex. In this context, speaker 832 emits utterance 862 of "My dawg and nefew here should get toys from Sanda Claws."

Wearable computing device 834 can generate a corrected text segment based on utterance 862 that take timing information, such as the day of the year, into account. For example, as the day of the year at 860A is December 21 which is four days before Christmas, wearable computing device 834 can determine that text has a higher probability of Christmas-related words than at other times of the year. Then, as part of a context, wearable computing device 834 can include a dictionary of seasonal or holiday-related words, such as "Christmas", "Santa Claus", "gifts", etc.

In scenario 860, wearable computing device 834 can determine the input that the text of "Sanda Claws" on December 21 is likely to be "Santa Claus." Also, wearable computing device 834 can correct misspellings like "dawg" and "nefew." Accordingly, at 860B1 of FIG. 8A, wearable computing device 834 is shown as having generated corrected text segment 864 of "My dog and nephew here should get toys from Santa Claus."

In some embodiments, as discussed above, wearable computing device 834 can take proximate entities into account as well, such as Rover the dog and Alex the nephew. After taking proximate entities into account at 860B2 of FIG. 8A, wearable computing device 834 is shown as having generated corrected text segment 866 of "Rover and Alex should get toys from Santa Claus."

At 860A of FIG. 8C, the date is identified as July 21, and speaker 832, associated with wearable computing device 834, is proximate to a dog, Rover. In this context, speaker 832 emits utterance 872 of "Rover gets sanda claws at the beach."

Scenario 860 has a date of July 21, which is during summer in the Northern Hemisphere. As such, wearable computing device 834 can determine that a location of wearable computing device 834 is within the Northern Hemisphere and that the season is summer. Taking the day of the year at 860C of July 21 into account, wearable computing device 834 can determine that text has a higher probability of summer-related words than at other times of the year. Then, as part of a context, wearable computing device 834 can include a dictionary of seasonal words, such as "sun," "hiking," "swimming," "sand," "beach," "sun tan," "boating," etc.

In scenario 860, wearable computing device 834 can determine the input that the text of "sanda claws" on July 21 is likely to be "sandy claws" (or perhaps "sand in his claws") and accordingly generate corrected text segment 874. At 860D of FIG. 8C, display/lens 840 of wearable computing device 834 displays corrected text segment 874 of "Rover gets sandy claws at the beach."

In other scenarios, information about current topics, news, or trends can be used in a context to correct text segments. For example, suppose a popular new singer, Singer YourA, was recently involved in an accident. Then, a wearable computing device can use public search information, such as trending searches from popular web sites, public electronic communications (e.g., tweets, blog entries, comments), news searches, and additional information to correct input text of "Did you know singer yourA was in an accident?" to be "Did you know Singer YourA was in an accident?"

Many other examples of correcting speech based on speech-patterns and contexts, including location-sensitive contexts are possible as well.

Example Operation

Figure 9:
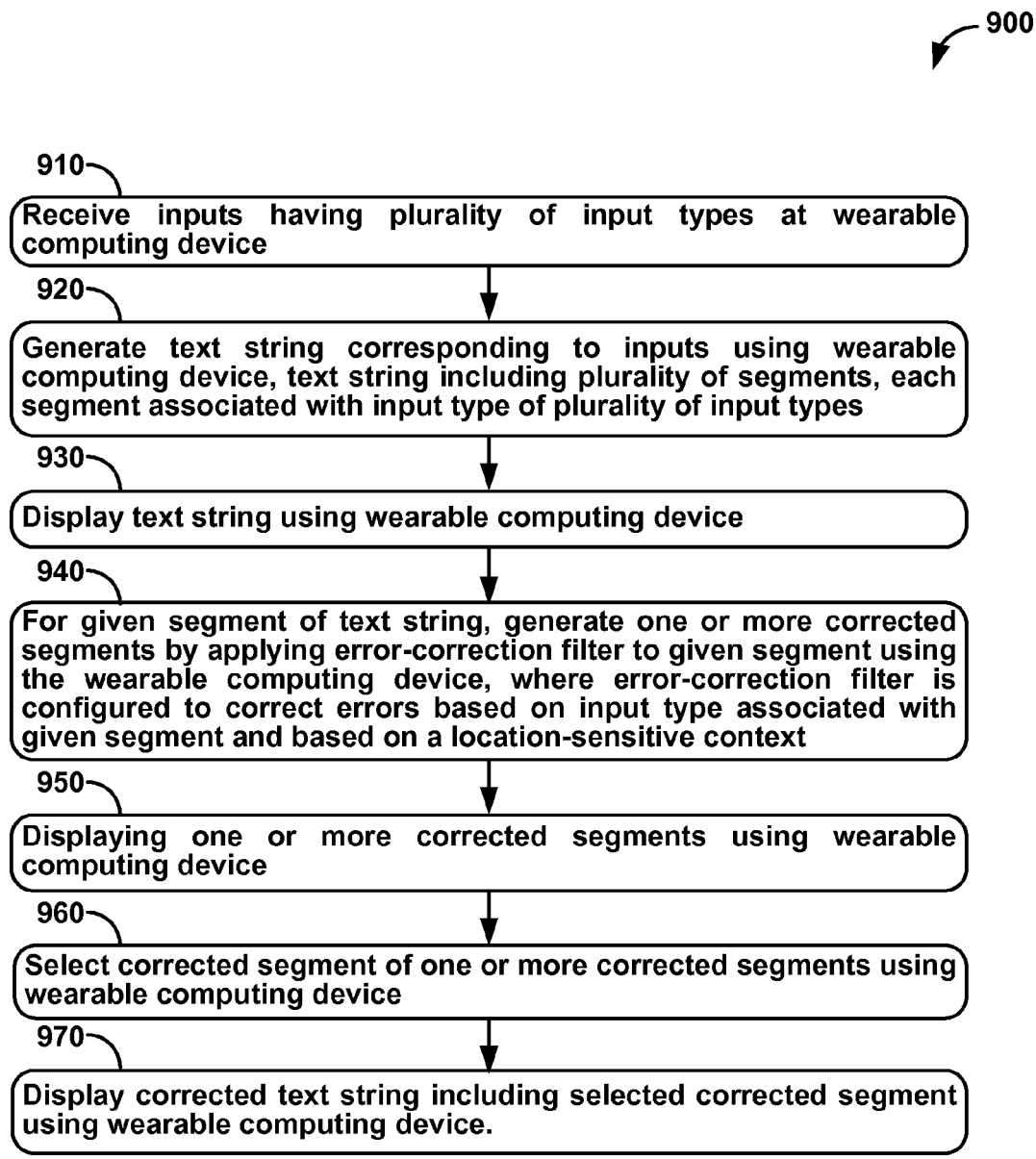
FIG. 9 is a flow chart of a method in accordance with an example embodiment.

FIG. 9 is a flow chart of an example method 900 in accordance with an example embodiment. At block 910, inputs having a plurality of input types can be received at a wearable computing device. In some embodiments, the plurality of input types include speech, text entry, handwriting, and optical character recognition (OCR). Receiving inputs from a plurality of input types at wearable computing devices is described above with reference to at least FIGS. 4-8C.

At block 920, a text string corresponding to the inputs can be generated using the wearable computing device. The text string can include a plurality of segments, where each segment is associated with an input type of the plurality of input types. Generating text strings related to inputs is described above with reference to at least FIGS. 4-8C.

At block 930, the text string can be displayed using the wearable computing device. Displaying text strings is described above with reference to at least FIGS. 2 and 4-8C.

In some embodiments, displaying the text string includes: (a) associating a first color with a first input type of the plurality of input types, (b) associating a second color with a second input type of the plurality of input types, where the first and second input types differ, and where the first and second colors differ, (c) displaying each segment of the text string associated with the first input type using the first color; and (d) displaying each segment of the text string associated with the second input type using the second color. Displaying text strings distinguished by input type and/or source is described above with reference to at least FIG. 5A.

At block 940, for a given segment of the text string, one or more corrected segments can be generated by applying an error-correction filter to the given segment using the wearable computing device. The error-correction filter can be configured to correct errors based on an input type associated with the given segment. Correcting errors using error-correction filters is described above with reference to at least FIGS. 4-8C.

In some embodiments, the error-correction filter can be further configured to correct errors based on a given input source. In particular embodiments, the input type associated with the segment is speech, and the given input source is a speaker of the speech. Correcting errors based on given input types and sources is described above with reference to at least FIGS. 4-7.

In other embodiments, the error-correction filter can be further configured to correct errors based on a location-sensitive context associated with the given segment. Correcting errors based on a location-sensitive context is described above with reference to at least FIGS. 8A-8C.

In particular embodiments, the location-sensitive context can include information about one or more entities proximate to a location of the wearable computing device, such as discussed above in more detail with respect to at least FIGS. 8B and 8C.

In some scenarios, at least some of the one or more entities are people. In particular of these scenarios the information about the one or more entities comprises information about one or more speech patterns of the people, such as discussed above in more detail with respect to at least FIG. 8B. In other scenarios, the information about the one or more entities includes identification information about the one or more entities, such as discussed above in more detail with respect to at least FIGS. 8B and 8C.

In other embodiments, the location-sensitive context can include information about one or more speech patterns associated with a location of the wearable computing device, such as discussed above in the context of FIG. 8A. In some of these other embodiments, the location of the wearable computing device can be associated with a building, and the one or more speech patterns associated with the location can include one or more speech patterns associated with an activity associated with the building, such as discussed above in the context of FIG. 8A.

In even other embodiments, the location-sensitive context can be associated with one or more documents. In these embodiments, displaying the least the one or more corrected segments can include: identifying a document of the one or more documents associated with a corrected segment of the one or more corrected segments, and updating the corrected segment based on information in the identified document. Contexts that include documents are discussed above in the context of at least FIGS. 5A-7.

In still other embodiments, the location-sensitive context can include information about current topics, news, and trends, such as discussed above in more detail with respect to at least FIG. 8C.

At block 950, at least the one or more corrected segments can be displayed using the wearable computing device. Displaying corrected segments is described above with reference to at least FIGS. 5A-8C.

In some embodiments, displaying the corrected segments includes displaying corrected segments associated with a first input type using the first color. Displaying distinguished corrected segments is described above with reference to at least FIGS. 5A and 7.

In other embodiments, displaying the corrected segments includes: identifying a person of the one or more entities associated with a corrected segment of the one or more corrected segments and updating the corrected segment based on the speech pattern of the identified person, such as discussed above in more detail in the context of at least FIG. 8B.

In still other embodiments, displaying the corrected segments includes: identifying an entity of the one or more entities associated with a corrected segment of the one or more corrected segments; and updating the corrected segment based on the identification information about the entity, such as discussed above in more detail in the context of at least FIG. 8B. In particular of the still other embodiments, updating the corrected segment based on the identification information about the entity includes inserting at least part of the identification information into the corrected segment, such as discussed above in more detail in the context of at least FIG. 8B.

In even other embodiments, displaying the corrected segments includes: identifying a location associated with a corrected segment of the one or more corrected segment and updating the corrected segment based on a speech pattern of the one or more speech patterns associated with the location.

Displaying distinguished corrected segments is described above with reference to at least FIGS. 5A and 7.

In further embodiments, the location-sensitive context comprises a phrase associated with the time of the year. In these further embodiments, displaying the least the one or more corrected segments can include: (a) determining that the time of the year is associated with a corrected segment of the one or more corrected segments, (b) determining that the phrase associated with the time of the year is also associated with the corrected segment, and (c) updating the corrected segment based on the phrase associated with the time of the year.

At block 960, a corrected segment of the one or more corrected segments can be selected using the wearable computing device. For example, a manual correction technique can be used for selecting a corrected segment. Selecting corrected segments is discussed above with reference to at least FIGS. 4-5C.

At block 970, a corrected text string comprising the selected corrected segment can be displayed using the wearable computing device. Displaying corrected text strings is discussed above with reference to at least FIGS. 4-8C.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
receiving, at a wearable computing device, inputs having a plurality of input types;
generating a text string corresponding to the inputs using the wearable computing device, the text string comprising a plurality of segments, each segment associated with an input type of the plurality of input types;
displaying the text string using the wearable computing device by at least:
associating a first color with a first input type of the plurality of input types,
associating a second color with a second input type of the plurality of input types, wherein the first input type differs from the second input type, and wherein the first color differs from the second color,
displaying each segment of the text string associated with the first input type using the first color, and
displaying each segment of the text string associated with the second input type using the second color;
for a given segment of the text string, generating one or more corrected segments by applying an error-correction filter to the given segment using the wearable computing device, wherein the error-correction filter is configured to correct errors based on an input type associated with the given segment and on a location-sensitive context;
displaying at least the one or more corrected segments using the wearable computing device, wherein displaying the at least the one or more corrected segments comprise displaying the at least the one or more corrected segments associated with the first input type using the first color;
selecting a selected corrected segment of the one or more corrected segments using the wearable computing device; and
displaying a corrected text string comprising the selected corrected segment using the wearable computing device.

2. The method of claim 1, wherein the plurality of input types comprise speech, text entry, handwriting, and optical character recognition (OCR).

3. The method of claim 1, wherein the error-correction filter is further configured to correct errors based on a given input source.

4. The method of claim 3, wherein the input type associated with the segment is speech, and the given input source is a speaker of the speech.

5. The method of claim 1, wherein the location-sensitive context comprises information about at least one of news, current topics, and trends.

6. The method of claim 1, wherein the location-sensitive context comprises information about one or more entities proximate to a location of the wearable computing device.

7. The method of claim 6, wherein at least some of the one or more entities are people.

8. The method of claim 7, wherein the information about the one or more entities comprises information about one or more speech patterns of the people.

9. The method of claim 8, wherein displaying the least the one or more corrected segments comprises:
identifying a person of the one or more entities associated with a corrected segment of the one or more corrected segments;
updating the corrected segment based on the speech pattern of the identified person.

10. The method of claim 6, wherein the information about the one or more entities comprises identification information about the one or more entities.

11. The method of claim 10, wherein displaying the least the one or more corrected segments comprises:
identifying an entity of the one or more entities associated with a corrected segment of the one or more corrected segments; and
updating the corrected segment based on the identification information about the entity.

12. The method of claim 11, wherein updating the corrected segment based on the identification information about the entity comprises:
inserting at least part of the identification information into the corrected segment.

13. The method of claim 1, wherein the location-sensitive context comprises information about one or more speech patterns associated with a location of the wearable computing device.

14. The method of claim 13, wherein displaying the least the one or more corrected segments comprises:
identifying a location associated with a corrected segment of the one or more corrected segments;
updating the corrected segment based on a speech pattern of the one or more speech patterns associated with the location.

15. The method of claim 13, wherein the location of the wearable computing device is associated with a building, and wherein the one or more speech patterns associated with the location comprise one or more speech patterns associated with an activity associated with the building.

16. The method of claim 1, wherein the location-sensitive context is further associated with one or more documents, and
wherein displaying the least the one or more corrected segments comprises:
identifying a document of the one or more documents associated with a corrected segment of the one or more corrected segments; and
updating the corrected segment based on information in the identified document.

17. The method of claim 1, wherein the location-sensitive context is further associated with a time of a year,
wherein the location-sensitive context comprises a phrase associated with the time of the year, and
wherein displaying the least the one or more corrected segments comprises:
determining that the time of the year is associated with a corrected segment of the one or more corrected segments,
determining that the phrase associated with the time of the year is also associated with the corrected segment, and
updating the corrected segment based on the phrase associated with the time of the year.

18. A wearable computing device, comprising:
a display;
a plurality of input devices, each input device associated with an input type;
a processor; and
memory having one or more instructions that, in response to execution by the processor, causes the wearable computing device to perform functions comprising:
receiving inputs from at least some of the plurality of input devices;

generating a text string corresponding to the inputs, the text string comprising a plurality of segments, each segment associated with an input type of the plurality of input types;

displaying the text string using the display by at least:

associating a first color with a first input type of the plurality of input types, associating a second color with a second input type of the plurality of input types, wherein the first input type differs from the second input type, and wherein the first color differs from the second color, displaying each segment of the text string associated with the first input type using the first color, and displaying each segment of the text string associated with the second input type using the second color;

for a given segment of the text string, generating one or more corrected segments by applying an error-correction filter to the given segment using the wearable computing device, wherein the error-correction filter is configured to correct errors based on an input type associated with the given segment and on a location-sensitive context;

displaying at least the one or more corrected segments using the display, wherein displaying the at least the one or more corrected segmented comprises displaying at least the one or more corrected segments associated with the first input type using the first color;

selecting a selected corrected segment of the one or more corrected segments; and displaying a corrected text string comprising the selected corrected segment using the display.

19. An article of manufacture including a computer-readable storage medium having instructions stored thereon that, in response to execution by a processor, cause the processor to perform operations, the instructions comprising:

instructions for receiving inputs having a plurality of input types;

instructions for generating a text string corresponding to the inputs, the text string comprising a plurality of segments, each segment associated with an input type of the plurality of input types;

instructions for displaying the text string comprising:

instructions for associating a first color with a first input type of the plurality of input types, instructions for associating a second color with a second input type of the plurality of input types, wherein the first input type differs from the second input type, and wherein the first color differs from the second color, instructions for displaying each segment of the text string associated with the first input type using the first color, and instructions for displaying each segment of the text string associated with the second input type using the second color;

instructions for generating, for a given segment of the text string, one or more corrected segments by applying an error-correction filter to the given segment, wherein the error-correction filter is configured to correct errors based on an input type associated with the given segment and on a location-sensitive context;

instructions for displaying at least the one or more corrected segments, wherein displaying the at least the one or more corrected segments comprises displaying at least the one or more corrected segments associated with the first input type using the first color;

instructions for selecting a selected corrected segment of the one or more corrected segments; and instructions for displaying a corrected text string comprising the selected corrected segment.

\* \* \* \* \*